(12) United States Patent
Dumas et al.

(10) Patent No.: US 12,365,240 B1
(45) Date of Patent: Jul. 22, 2025

(54) METHOD FOR CONTROLLING A DRIVETRAIN FOR AN OFF-ROAD VEHICLE

(71) Applicant: BOMBARDIER RECREATIONAL PRODUCTS INC., Valcourt (CA)

(72) Inventors: Francois-Charles Dumas, Saint-Denis-de-Brompton (CA); David Fillion, Drummondville (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 809 days.

(21) Appl. No.: 17/513,599

(22) Filed: Oct. 28, 2021

Related U.S. Application Data

(60) Provisional application No. 63/108,488, filed on Nov. 2, 2020.

(51) Int. Cl.
*B60K 23/08* (2006.01)

(52) U.S. Cl.
CPC ...... *B60K 23/08* (2013.01); *B60K 2023/0883* (2013.01)

(58) Field of Classification Search
CPC .............. B60K 23/08; B60K 2023/0883
See application file for complete search history.

(56) References Cited

U.S. PATENT DOCUMENTS

| 8,403,104 B2 * | 3/2013 | Gagnon | B62D 6/007 180/446 |
| 8,875,830 B2 | 11/2014 | Massicotte et al. | |
| 2016/0159356 A1 * | 6/2016 | Hoff | B60W 10/101 701/48 |
| 2018/0170177 A1 * | 6/2018 | Yamamoto | B60K 23/0808 |

FOREIGN PATENT DOCUMENTS

| CA | 2522707 A1 * | 4/2006 | ......... A01G 23/006 |
| WO | 2014210579 A1 | 12/2014 | |

* cited by examiner

*Primary Examiner* — Jacob D Knutson
(74) *Attorney, Agent, or Firm* — BCF LLP

(57) ABSTRACT

A method for controlling a drivetrain of a vehicle, including: receiving, by a controller, an indication to control a disconnect unit of the drivetrain, the disconnect unit being configured to selectively transfer torque to a front portion of the drivetrain to drive two front wheels of the vehicle; controlling, by the controller, an actuator operatively connected to the disconnect unit to cause the disconnect unit to transfer torque to the front portion of the drivetrain to drive the two front wheels; receiving, by the controller, from at least one sensor communicatively connected to the controller, at least one signal related to at least one driving condition; determining if the at least one signal received satisfies a predetermined condition; and in response to the at least one signal received satisfying the predetermined condition, controlling, by the controller, the disconnect unit to stop transferring torque to the front portion of the drivetrain.

20 Claims, 15 Drawing Sheets

METHOD FOR CONTROLLING A DRIVETRAIN FOR AN OFF-ROAD VEHICLE

CROSS-REFERENCE

The present application claims priority to U.S. Provisional Patent Application No. 63/108,488, entitled "Method for Controlling a Drivetrain for an Off-Road Vehicle," filed on Nov. 2, 2020, the entirety of which is incorporated herein by reference.

FILED OF TECHNOLOGY

The present technology relates to drivetrains and methods for controlling drivetrains for off-road vehicles.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit area, a roll cage and a steering wheel.

To be able to operate in off-road conditions, a side-by-side off-road vehicle needs to be able to handle various surfaces including, but not limited to, sand, dirt and mud. These conditions represent unique challenges not typically encountered when designing on-road vehicles such as a car.

One such challenge is that varying road conditions can mean that operating the vehicle in four-wheel drive mode may be preferable for handling the terrain at one moment, but due to a sudden change in terrain, driving the vehicle in two-wheel drive mode may be preferred mode at the next moment.

Thus, there is a desire for a transmission system suitable for the operating conditions of side-by-side off-road vehicles.

SUMMARY

It is an object of the present technology to ameliorate at least some of the inconveniences present in the prior art.

According to an aspect of the present technology, there is provided a four-wheel vehicle selectively drivable in 2×4 and 4×4 modes. There is also provided a six-wheel vehicle selectively drivable in 2×6, 4×6, and 6×6 modes. Each vehicle includes one or more disconnect units to selectively control the transfer of torque between the transmission and the front wheels, as well as between the transmission and the rear wheels for the six-wheel vehicle. Forward disconnect units are disposed forward of the vehicle seats and the cockpit area, with the motor being located rearward of the seats and cockpit area. There is further provided methods for controlling the drivetrain, specifically the disconnect units. The disconnects units are controlled automatically by a controller, which activates or deactivates the disconnect unit, to put the vehicle into 2×4 or 4×4 mode, in response to signals from one or more sensors in the vehicle.

According to one aspect of the present technology, there is provided a method for controlling a drivetrain of a vehicle. The method includes receiving, by a controller, an indication to control a disconnect unit of the drivetrain, the disconnect unit being configured to selectively transfer torque to a front portion of the drivetrain to drive two front wheels of the vehicle; controlling, by the controller, an actuator operatively connected to the disconnect unit to cause the disconnect unit to transfer torque to the front portion of the drivetrain to drive the two front wheels; receiving, by the controller, from at least one sensor communicatively connected to the controller, at least one signal related to at least one driving condition; determining if the at least one signal received satisfies a predetermined condition; and in response to the at least one signal received satisfying the predetermined condition, controlling, by the controller, the disconnect unit to stop transferring torque to the front portion of the drivetrain.

In some implementations, the method further includes, subsequent to controlling the disconnect unit to stop transferring torque to the front portion of the drivetrain: receiving, by the controller, from the at least one sensor, at least one additional signal related to at least one additional driving condition; determining if the at least one additional signal received satisfies an additional predetermined condition; and in response to the at least one additional signal satisfying the additional predetermined condition, controlling, by the controller, the disconnect unit to recommence transferring torque to the front portion of the drivetrain thereby driving the front wheels.

In some implementations, receiving the indication to control the disconnect unit includes receiving the indication to control the disconnect unit from a control input disposed in a cockpit area of the vehicle.

In some implementations, the controller is configured to control the disconnect unit according to a plurality of driving modes; and receiving the indication to control the disconnect unit includes receiving, by the controller, from the control input, an indication of selection of one of the plurality of driving modes.

In some implementations, the method further includes prior to controlling the actuator to cause the disconnect unit to transfer torque to the front portion of the drivetrain, receiving, by the controller, from the control input, at least one activation signal; and wherein: the controller controls the actuator to cause the disconnect unit to transfer torque to the front portion of the drivetrain to drive the two front wheels in response to the at least one activation signal.

In some implementations, receiving the at least one signal from the at least one sensor includes receiving the at least one signal from at least one of: a front wheel speed sensor; a rear wheel speed sensor; a brake sensor; an accelerometer; a gyroscope; an accelerator position sensor; and an engine torque sensor.

In some implementations, receiving the at least one signal related to the at least one driving condition from the at least one sensor includes: receiving, by the controller, a front wheel speed from a front wheel speed sensor, and receiving, by the controller, a rear wheel speed from a rear wheel speed sensor. The method further includes determining, by the controller, based on at least the front wheel speed and the rear wheel speed, at least one of: a rear to front wheel speed ratio, and a rear to front wheel speed difference; and controlling the disconnect unit to stop selectively transferring torque to the front portion of the drivetrain in response to receiving the at least one signal includes controlling the disconnect unit in response to the at least one of the rear to front wheel speed ratio and the rear to front wheel speed difference satisfying a predetermined speed condition.

In some implementations, receiving the at least one signal related to the at least one driving condition from the at least one sensor includes receiving, by the controller, at least one of: a front wheel speed from a front wheel speed sensor, a rear wheel speed from a rear wheel speed sensor, an accelerator position from an accelerator position sensor, an accelerator position gradient from the accelerator position sensor, a brake state from a brake sensor, an acceleration from an accelerometer, an angular acceleration from a gyroscope, and an engine torque from an engine torque sensor; and determining if the at least one signal received satisfies the predetermined condition includes comparing to predetermined condition values, stored in the controller, to the at least one of the front wheel speed, the rear wheel speed, the accelerator position, the accelerator position gradient, the acceleration, the angular acceleration, and the engine torque.

In some implementations, the at least one signal is at least one first signal; the predetermined condition is a first predetermined condition; and further including: receiving, by the controller, a second signal related to a different driving condition, the second signal including at least one of the front wheel speed, the rear wheel speed, the accelerator position, the accelerator position gradient, the acceleration, the angular acceleration, and the engine torque; determining if the second signal received satisfies a second predetermined condition; and in response to the second signal received satisfying the second predetermined condition, controlling, by the controller, the disconnect unit to recommence transferring torque to the front portion of the drivetrain.

In some implementations, the controller is configured to control the disconnect unit according to a plurality of driving modes; the indication to control the disconnect unit includes an indication of selection of one of the plurality of driving modes.

In some implementations, the plurality of modes includes at least: a mode for driving on trails; a mode for driving in mud; and a mode for rock crawling.

According to one aspect of the present technology, there is provided a vehicle including a frame; a motor connected to the frame; a transmission operatively connected to the motor for receiving torque therefrom; a rear gear train operatively connected to the transmission; two rear wheels operatively connected the rear gear train for driving the rear wheels; a disconnect unit operatively connected to the transmission, the disconnect unit being disposed forward of the motor; a front gear train operatively connected to the disconnect unit, the front gear train being disposed forward of the disconnect unit; two front wheels operatively connected to the front gear train for driving the front wheels, the disconnect unit being configured to selectively transfer torque from the transmission to the front gear train thereby selectively driving the two front wheels; an actuator operatively connected to the disconnect unit for controlling selective torque transfer through the disconnect unit; and a controller communicatively connected to the actuator for controlling the disconnect unit.

In some implementations, the vehicle further includes a plurality of sensors communicatively connected to the controller, the controller being configured to control the disconnect unit based at least in part on signals received from at least one of the plurality of sensors.

In some implementations, the plurality of sensors includes at least one of: a front wheel speed sensor; a rear wheel speed sensor; a brake sensor; an accelerator position sensor; an engine torque sensor; an accelerometer; and a gyroscope.

In some implementations, the vehicle further includes a control input communicatively connected to the controller and the actuator; and wherein: the frame defines a cockpit area; the control input is disposed in the cockpit area; and the control input is configured and arranged to be operable by an operator sitting in the cockpit area.

In some implementations, the disconnect unit is a first disconnect unit, and the actuator is a first actuator; and the vehicle further includes an intermediate gear train operatively connected to the transmission, the intermediate gear train being disposed rearward of the front gear train; two intermediate wheels operatively connected to the intermediate gear train for driving the intermediate wheels; a second disconnect unit operatively connected between the intermediate gear train and the rear gear train, the second disconnect unit being disposed forward of the rear wheels; and a second actuator operatively connected to the second disconnect unit for controlling selective torque transfer through the second disconnect unit, the second actuator being communicatively connected to the controller and the control input, the second disconnect unit being configured to selectively transfer torque from the transmission, via the intermediate gear train, to the rear gear train thereby selectively driving the two rear wheels, the vehicle being configured to be operated in one of a 2×6 mode, a 4×6 mode, and a 6×6 mode.

In some implementations, the vehicle further includes at least one seat connected to the frame; and wherein the motor is disposed at least partially rearward of the at least one seat.

For purposes of this application, terms related to spatial orientation such as forwardly, rearward, upwardly, downwardly, left, and right, are as they would normally be understood by a driver of the vehicle sitting therein in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale, unless otherwise indicated.

DETAILED DESCRIPTION

The present technology will be described with respect to four-wheel and six-wheel off-road vehicles having side-by-side seats and steering wheels. However, it is contemplated that some aspects of the present technology may apply to other types of vehicles such as, but not limited to, off-road vehicles having a handlebar and a straddle seat (i.e. an all-terrain vehicle (ATV)) and off-road vehicles having more or less than four or six wheels.

Figure 1:
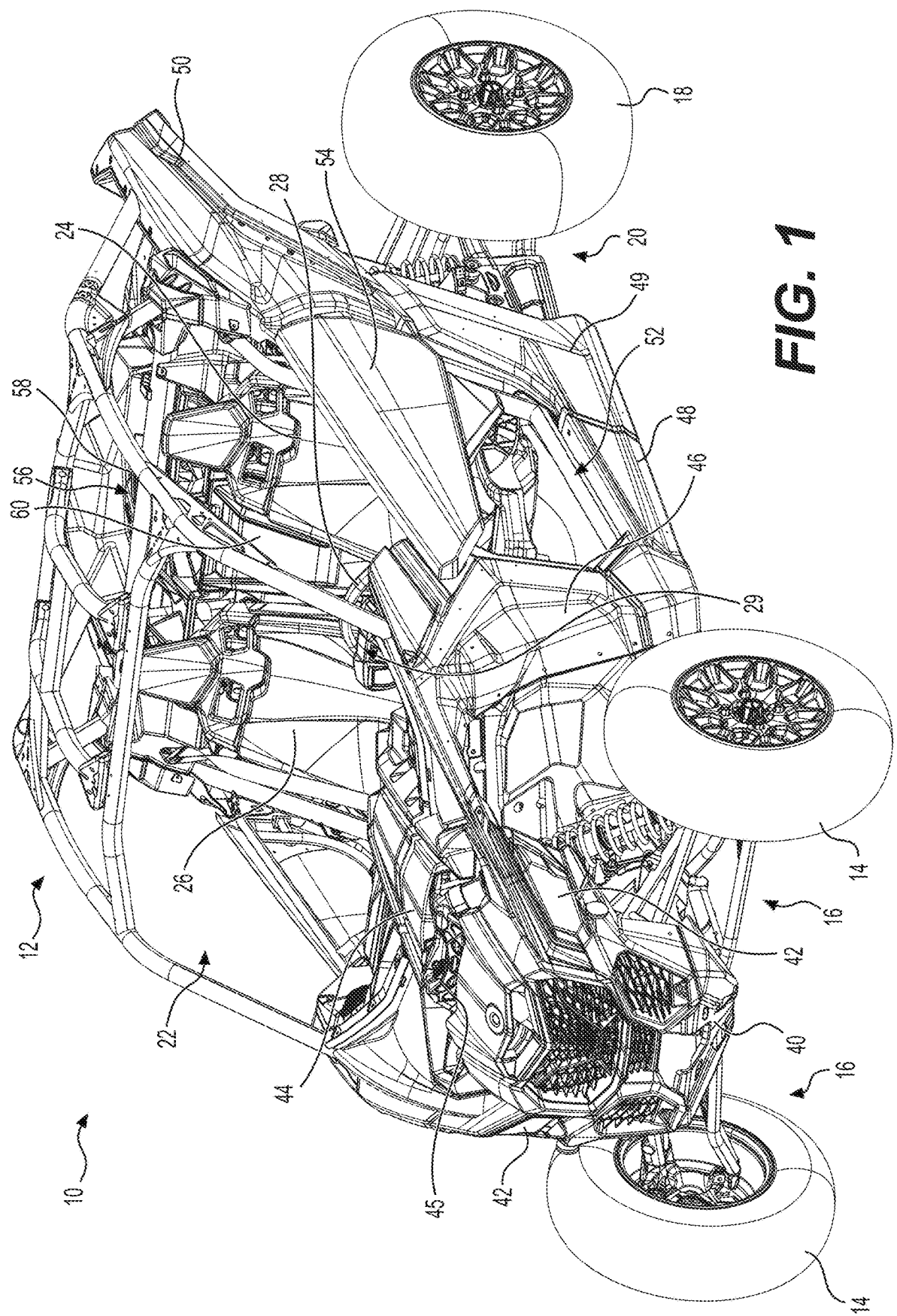
FIG. 1 is a front, left side perspective view of a four-wheel off-road vehicle.
Figure 2:
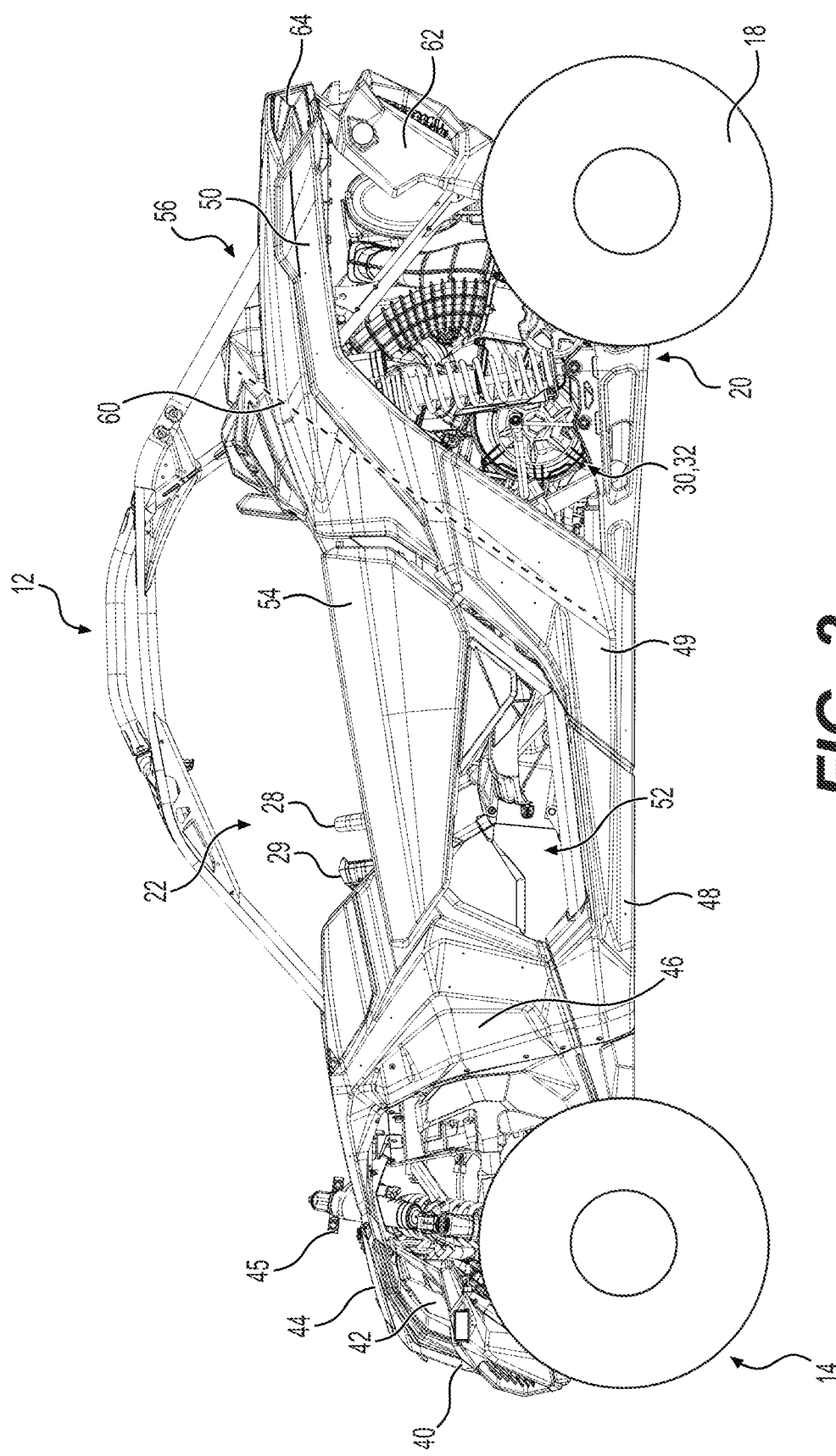
FIG. 2 is a left side elevation view of the vehicle of FIG. 1.

The general features of a four-wheel off-road vehicle 10 will be described with respect to FIGS. 1 to 3. The vehicle 10 has a frame 12 and two front wheels 14 connected to a front of the frame 12 by front suspension assemblies 16. The vehicle 10 also includes two rear wheels 18 connected to the frame 12 by rear suspension assemblies 20. Operation and control of the wheels 14, 18 will be described in more detail below.

The frame 12 defines a central cockpit area 22 inside which are disposed a driver seat 24 and a passenger seat 26. In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. A steering wheel 28 is disposed in front of the driver seat 24. The steering wheel 28 is used to turn the front wheels 14 to steer the vehicle 10 via a steering assembly 23 (shown schematically). A driver display 29, including various displays and gauges, is disposed above and forward the steering wheel 28 to provide information to the driver regarding the operating conditions of the vehicle 10. Examples of displays and gauges in the driver display 29 include, but are not limited to, a speedometer, a tachometer, a fuel gauge, a transmission position display, and an oil temperature gauge.

The vehicle 10 also includes body panels connected to the frame 12. The panels help protect the internal components of the vehicle 10 and provide some of the aesthetic features of the vehicle 10. Front panels 40 are connected to a front of the frame 12. The front panels 40 are disposed forward of the front suspension assemblies 16 and laterally between the front wheels 14. The front panels 40 define two apertures inside which the headlights 42 of the vehicle 10 are disposed. A cover 44 extends generally horizontally reward from a top of the front panels 40. The cover 44 defines an aperture 45 through which tops of the front suspension assemblies 16 protrude. Front fenders 46 are disposed rearward of the front panels 40 on each side of the vehicle 10. Each front fender 46 is disposed in part above and in part behind of its corresponding front wheel 14. Lower panels 48 extend along the bottom of the frame 12 between the front and rear wheels 14, 18. As can be seen in FIG. 2 for the left lower panel 48, each lower panel 48 has a front end disposed under the bottom portion of its corresponding front fender 46 and extends rearward therefrom. A generally L-shaped panel 49 is disposed behind the rear end of each lower panel 48. The L-shaped rear fenders 50 extend generally upward and then rearward from the rear, upper ends of the L-shaped panels 49. Each rear fender 50 is disposed in part above and in part forward of its corresponding rear wheel 18. The rear fenders 50 define apertures at the rear thereof to receive the brake lights 64 of the vehicle 10. It is contemplated that the brake lights 64 could be replaced with reflectors or that reflectors could be provided in addition to the brake lights 64.

On each side of the vehicle 10, the front fender 46, the lower panel 48, the L-shaped panel 49 and the rear fender 50 define a passage 52 through which a driver (or passenger depending on the side of the vehicle 10) can enter or exit the vehicle 10. Each side of the vehicle 10 is provided with a door 54 that selectively closes an upper portion of the corresponding passage 52. Each door 54 is hinged at a rear thereof to its corresponding rear fender 50 and associated portion of the frame 12 and is selectively connected at a front thereof to its corresponding front fender 46 via a releasable latch (not shown). It is contemplated that each door 54 could be hinged at a front thereof and latched at a rear thereof. As best seen in FIG. 2 for the left side of the vehicle 10, when the doors 54 are closed the lower portions of the passages 52 are still opened. It is contemplated that nets could extend in the lower portions of the passages 52 when the doors 54 are closed or that the doors 54 could be larger so as to close the lower portions of the passages 52.

Figure 3:
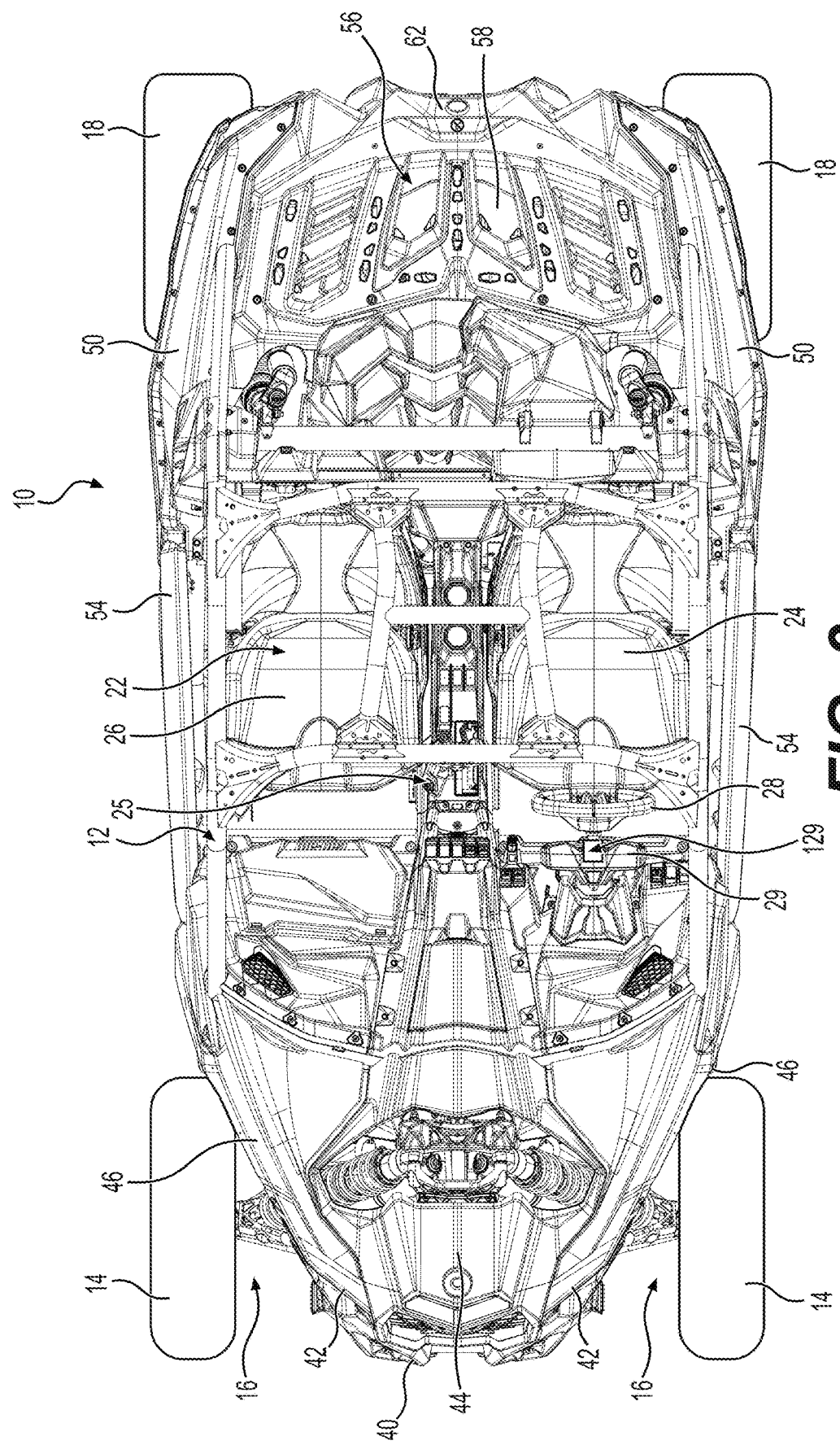
FIG. 3 is a top plan view of the vehicle of FIG. 1.

As best seen in FIG. 3, the rear fenders 50 define a cargo space 56 therebetween behind the seats 24, 26. The cargo space 56 has a floor 58 extending horizontally between the rear fenders 50. The floor 58 has a plurality of apertures such that the floor 58 can act as an attachments base to receive anchors such as those described in U.S. Pat. No. 8,875,830, issued Nov. 4, 2014, the entirety of which is incorporated herein by reference, in order to secure various items in the cargo space 56. It is contemplated that hooks or loops could be provided instead of or in addition to the apertures in the floor 58. It is also contemplated that the floor 58 could not be provided with any attachment features. It is contemplated that the floor 58 could be replaced by a cargo box that can be tilted in order to dump its content. As best seen in FIG. 3, rear panels 62 are disposed laterally between the rear wheels 18 behind the floor 58.

Figure 4:
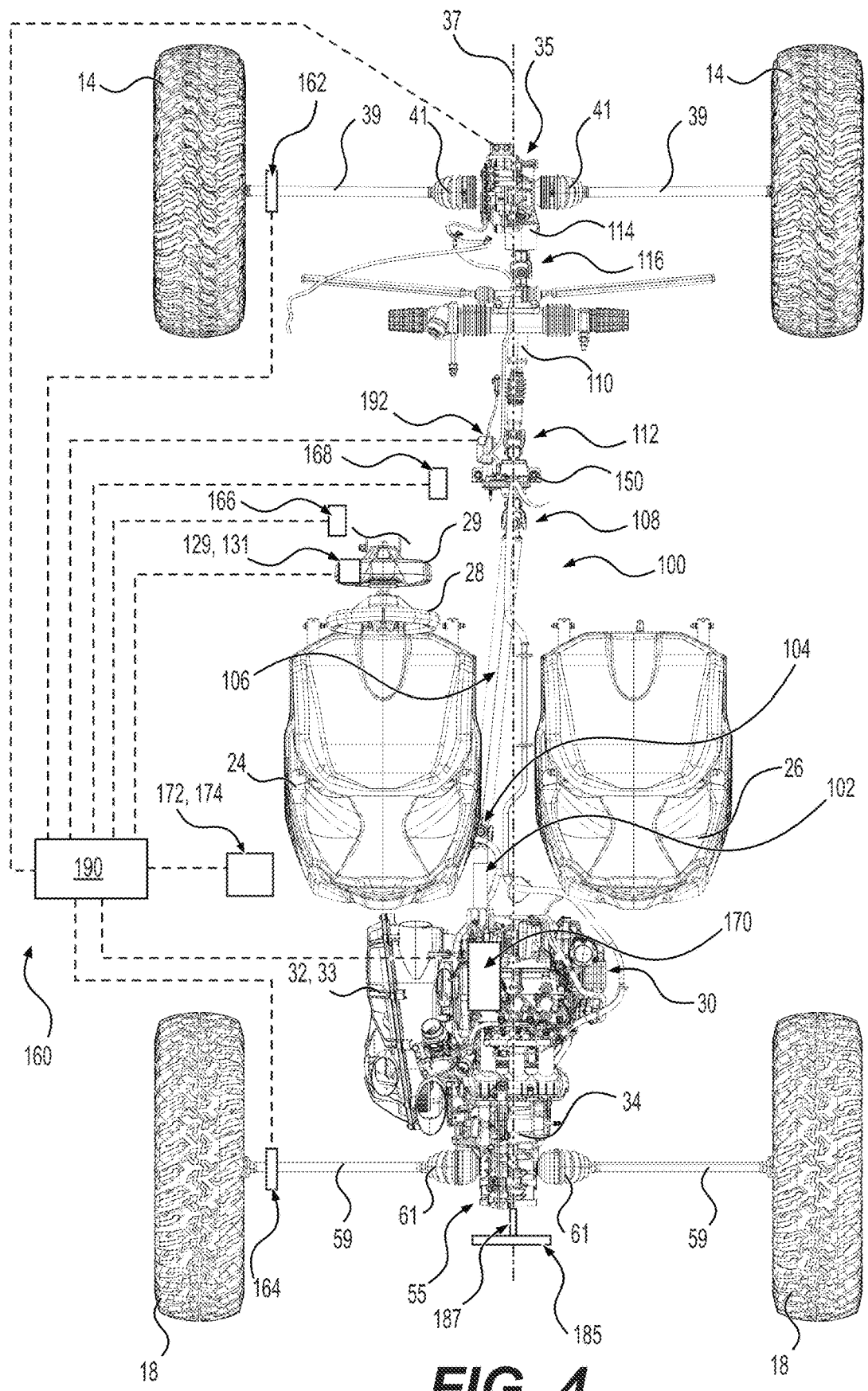
FIG. 4 is a top plan view of portions of the vehicle of FIG. 1, including a powertrain, wheels, and seats of the vehicle, with a control system schematically illustrated.
Figure 5:
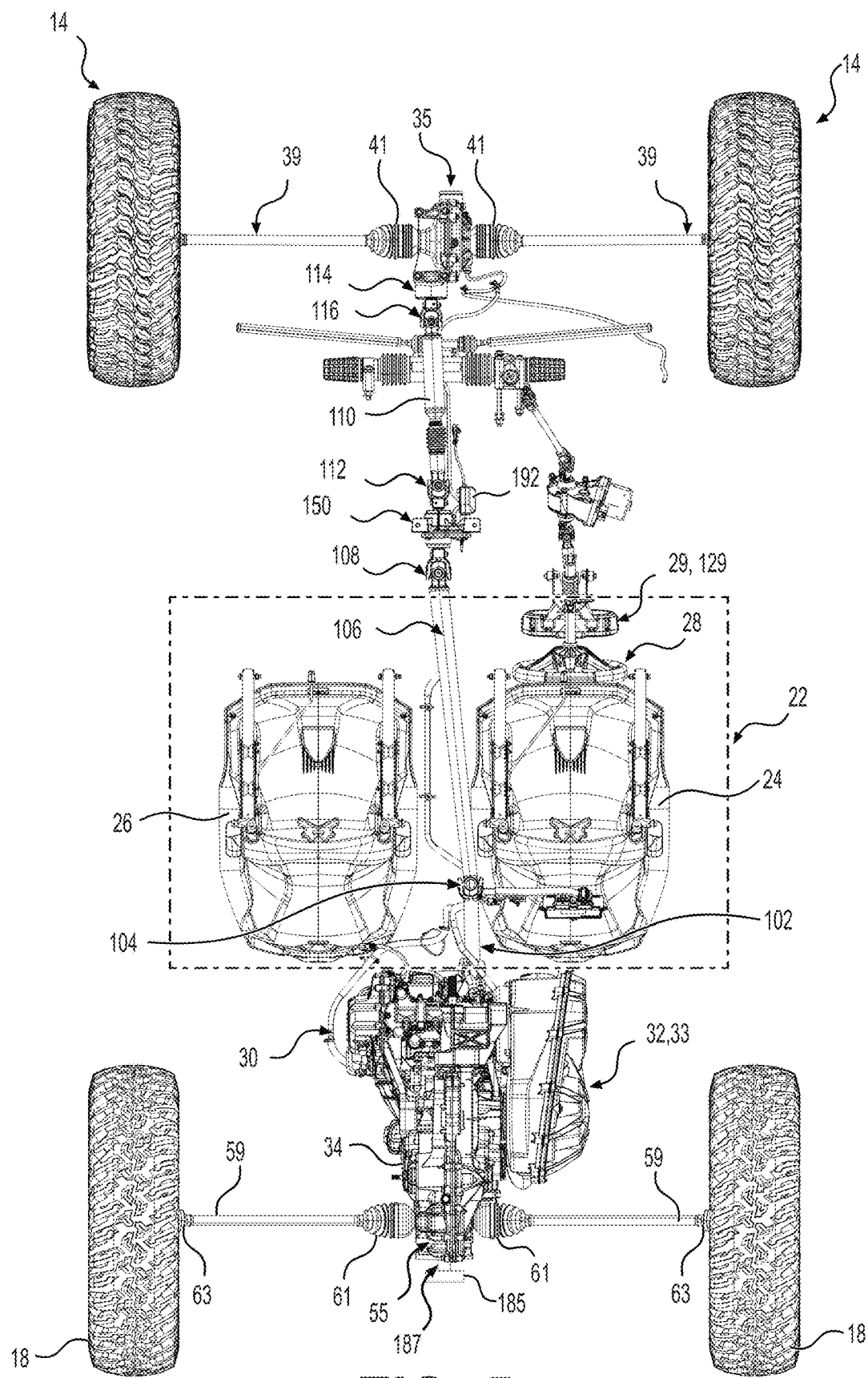
FIG. 5 is a bottom plan view of the vehicle portions of FIG. 4, with the control system removed.
Figure 6:
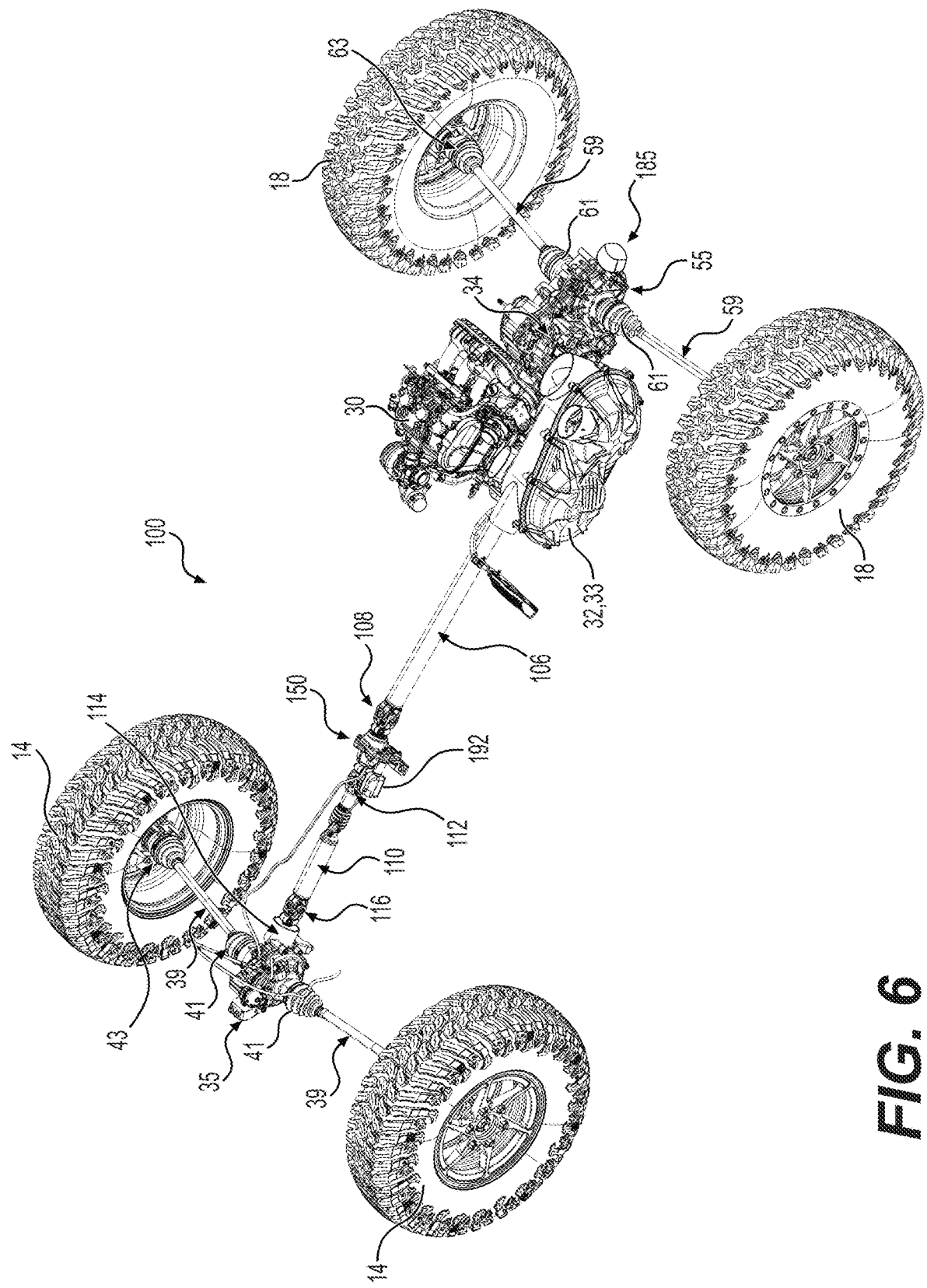
FIG. 6 is a top, rear, left side perspective view of the wheels and powertrain of the vehicle of FIG. 1.

Turning now to FIGS. 4 to 6, a powertrain of the vehicle 10 will be described in more detail. The powertrain includes a motor 30 and a drivetrain 100 for transferring torque from the motor 30 to the wheels 14, 18.

In the present implementation, the motor 30 is specifically an internal combustion engine 30, connected to the frame 12 in a rear portion of the vehicle 10. The engine 30 is an in-line, three-cylinder, four-stroke internal combustion engine. It is contemplated that other types of internal combustion engines could be use, such as a V-twin or a two-stroke internal combustion engine for example. It is also contemplated that in some implementations, the engine 30 could be replaced by another type of motor such as a diesel engine or an electric motor for example.

As can be seen in FIGS. 4 and 5, the engine 30 is disposed rearward of the seats 24, 26. A separating wall 60 extends laterally and is disposed longitudinally between the seats 24, 26 and the floor 58 (schematically illustrated in FIG. 2). The separating wall 60 thus separates the cockpit area 22 from the cargo area 56, and further separates the cockpit area 22 from the engine 30, the engine 30 being disposed rearward of the cockpit area 22.

The engine 30 is connected to a continuously variable transmission (CVT) 32 of the drivetrain 100, the transmission 32 receiving torque from the engine 30. The CVT 32 is mounted on the left side of the engine 30 and of a transaxle 34. The CVT 32 has a CVT housing 33, inside which are located a primary pulley, a secondary pulley, and a belt (not shown). It is contemplated that the CVT 32 could be mounted on the right side of the engine 30 and of the transaxle 34. The engine 30 drives the CVT 32 which drives the transaxle 34.

The transaxle 34 is mounted to the back of the engine 30. The transaxle 34 is mechanically connected to a shifter 25 (FIG. 3). The shifter 25 is disposed laterally between the two seats 24, 26. The shifter 25 allows the driver to select from a plurality of combinations of engagement of gears of the transaxle 34, commonly referred to as gears. In the present implementation, the shifter 25 allows the driver to select a reverse gear, two forward gears (high and low) and a neutral position in which the transaxle 34 does not transmit torque to the wheels 14, 18. It is contemplated that other types of connections between the shifter 25 and the transaxle 34 could be used.

The transaxle 34 incorporates a rear gear train 55. The driven output gears (not shown) of the rear gear train 55 are operatively connected to and drive left and right rear half-shafts 59 via constant velocity (CV) joints (not shown), also known as homokinetic joints, located inside flexible covers 61. From the rear gear train 55, the rear half-shafts 59 extend downward (when the rear suspension assemblies 20 are in a resting position) and laterally outward. The laterally outward ends of the rear half-shafts 59 are operatively connected to and drive the rear wheel axles (not shown) via universal joints (not shown) located inside flexible covers 63.

The transaxle 34 has a plurality of gear trains connected to and driving a front output shaft 102 (FIGS. 4 and 5). The front output shaft 102 is operatively connected to and drives an intermediate driveshaft 106 via a universal joint 104. The front output shaft 102 is disposed to the left of a longitudinal centerline 37 of the vehicle 10.

From the universal joint 104, the driveshaft 106 extends forward and toward the right. The front end of the driveshaft 106 is connected to a disconnect unit 150 via a universal joint 108. The disconnect unit 150 will be described in more detail below. Specifically, the universal joint 108 connects to a connecting shaft 109 which extends partially into the disconnect unit 150.

Another driveshaft 110 is connected via a universal joint 112 to a front side of the disconnect unit 150. Specifically, the universal joint 112 connects to a connecting shaft 113 which extends partially into the disconnect unit 150. The disconnect unit 150 is configured and arranged to selectively cause the connecting shaft 113 to engage with the connecting shaft 109 in order to transfer torque from the shaft 109 to the shaft 113.

From the universal joint 112, the driveshaft 110 extends forward, upward and to the right. The front end of the driveshaft 110 is operatively connected to and drives a front input shaft 114 via a universal joint 116. The front input shaft 114 drives a front gear train 35. The driven output gears (not shown) of the front gear train 35 are operatively connected to and drive left and right front half-shafts 39 via universal joints (not shown) located inside flexible covers 41. From the front gear train 35, the front half-shafts 39 extend downward (when the front suspension assemblies 16 are in a resting position) and laterally outward. The laterally outward ends of the front half-shafts 39 are operatively connected to and drive the front wheel axles (not shown) via universal joints (not shown) located inside flexible covers 43.

Figure 7:
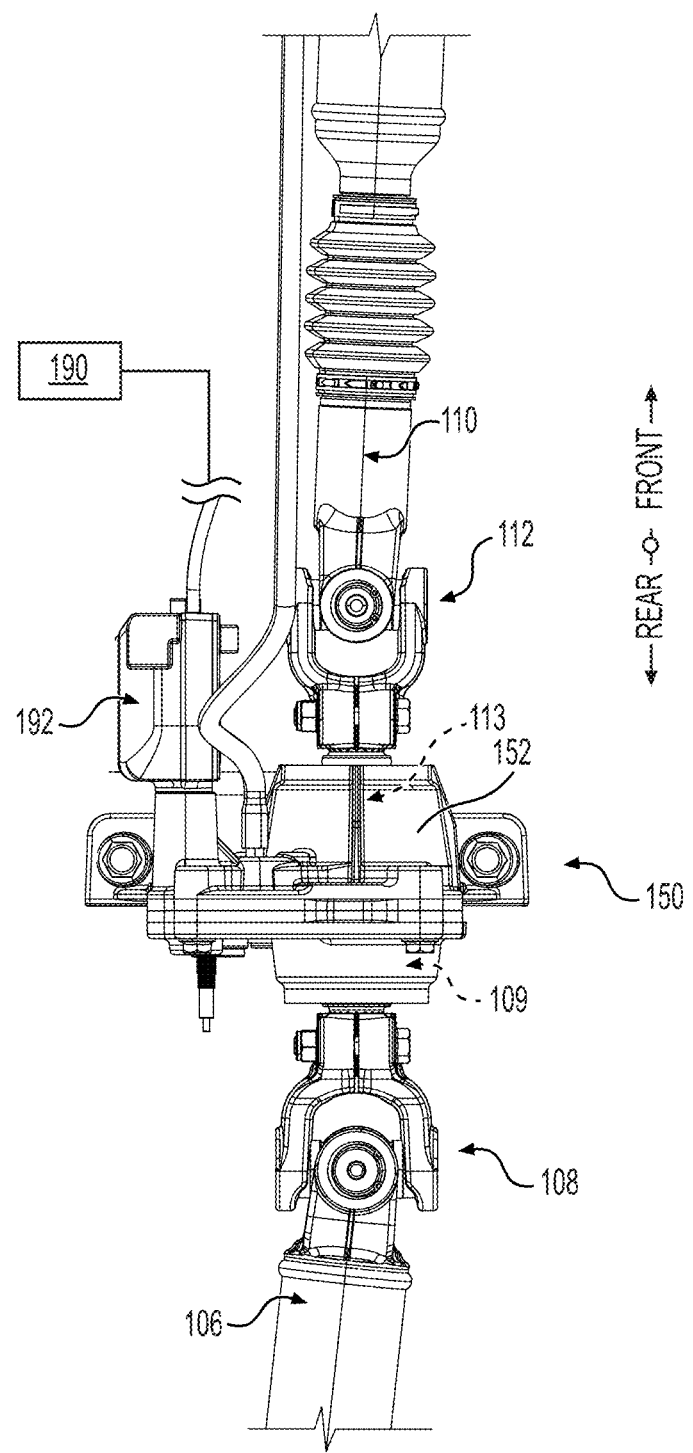
FIG. 7 is a close up, partial, top plan view of the drivetrain of FIG. 6, including a disconnect unit.
Figure 8:
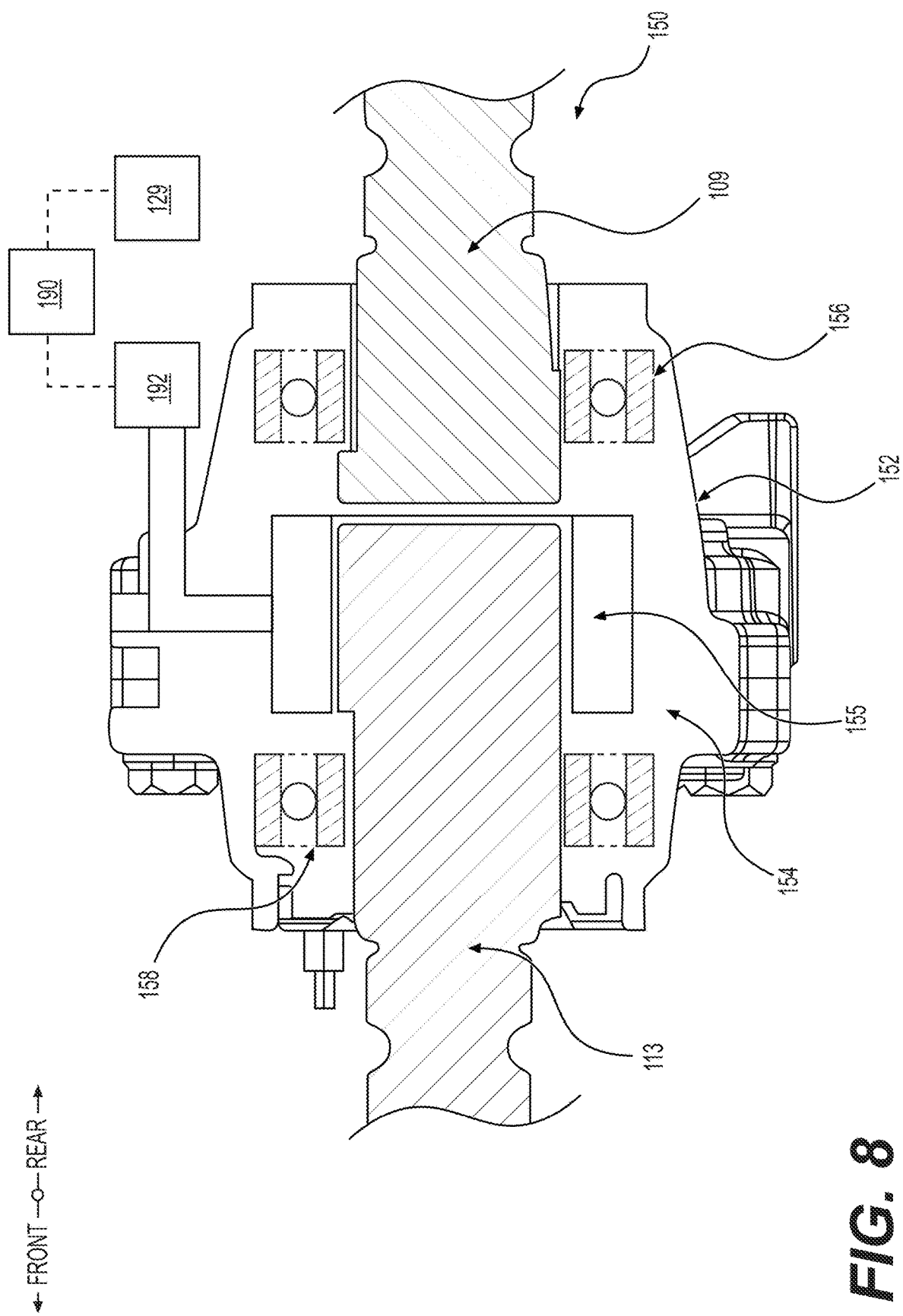
FIG. 8 is a cross-sectional view of the disconnect unit of FIG. 7, the cross-section being taken along a horizontal plane through a center of the disconnect unit.

With additional reference to FIGS. 7 and 8, the disconnect unit 150 will now be described in more detail. The disconnect unit 150 selectively transfers torque from the transmission 32 to the front gear train 35, via the shafts 102, 106, 109, 113, 110, 114. Specifically, when "activated", the disconnect unit 150 operatively connects the shaft 113 to the shaft 109 to transfer torque therethrough, and when "deactivated", the shaft 113 is disengaged from the shaft 109 and no torque is transferred. In this way, the vehicle 10 can be selectively driven in a 4×4 mode (with all four wheels 14, 18 being driven) or in 2×4 mode (with only the rear wheels 18 being driven). It is contemplated that the shaft and joint arrangement from the transmission 34 to the front gear train 35 could vary in different implementations. As is illustrated in FIG. 5, the disconnect unit 150 is disposed forward of the engine 30 and further forward of the seats 24, 26 and the cockpit area 22 (illustrated schematically in FIG. 5).

The disconnect unit 150 includes a housing 152 for housing the different components of the disconnect unit 150. The disconnect unit 150 includes a disconnect assembly 154 configured to selectively operatively connect the shaft 110 to the shaft 106 in order to transfer torque from the transmission 32 to the front drive train 35. In the illustrated implementation, the disconnect assembly 154 is a sliding splines assembly 154 where the actuator 192 causes a spline 155, disposed around a rear end of the shaft 113, to translate forward and rearward. By translating rearward, the spline 155 is caused to engage with the shaft 109. By translating forward, the spline 155 is caused to disengage from the shaft 109. It is contemplated that the arrangement of the spline 155 could be reversed, where the spline 155 could be disposed around a front end of the shaft 109 and selectively translate forward to engage with the rear end of the shaft 113.

The disconnect unit 150 further includes two bearings 156, 158 disposed in the housing 152. The bearing 156 receives the connecting shaft 109 therethrough. The bearing 158 receives the connecting shaft 113 therethrough. Each bearing 156, 158 includes ball bearings to allow smooth rotation of the shafts 109, 113 while supporting the weight of the shafts 109, 113. The bearings 156, 158 thus support the weight of the shafts 109, 113, and by extension the shafts 106, 110 as the drivetrain 100 extends from the transmission 32 to the front gear train 35. While the disconnect assembly 154 could be implemented separately from the bearings 156, 158, the combination of the components 154, 156, 158 into a single housing 152 may reduce production and assembly cost and complexity.

Figure 9:
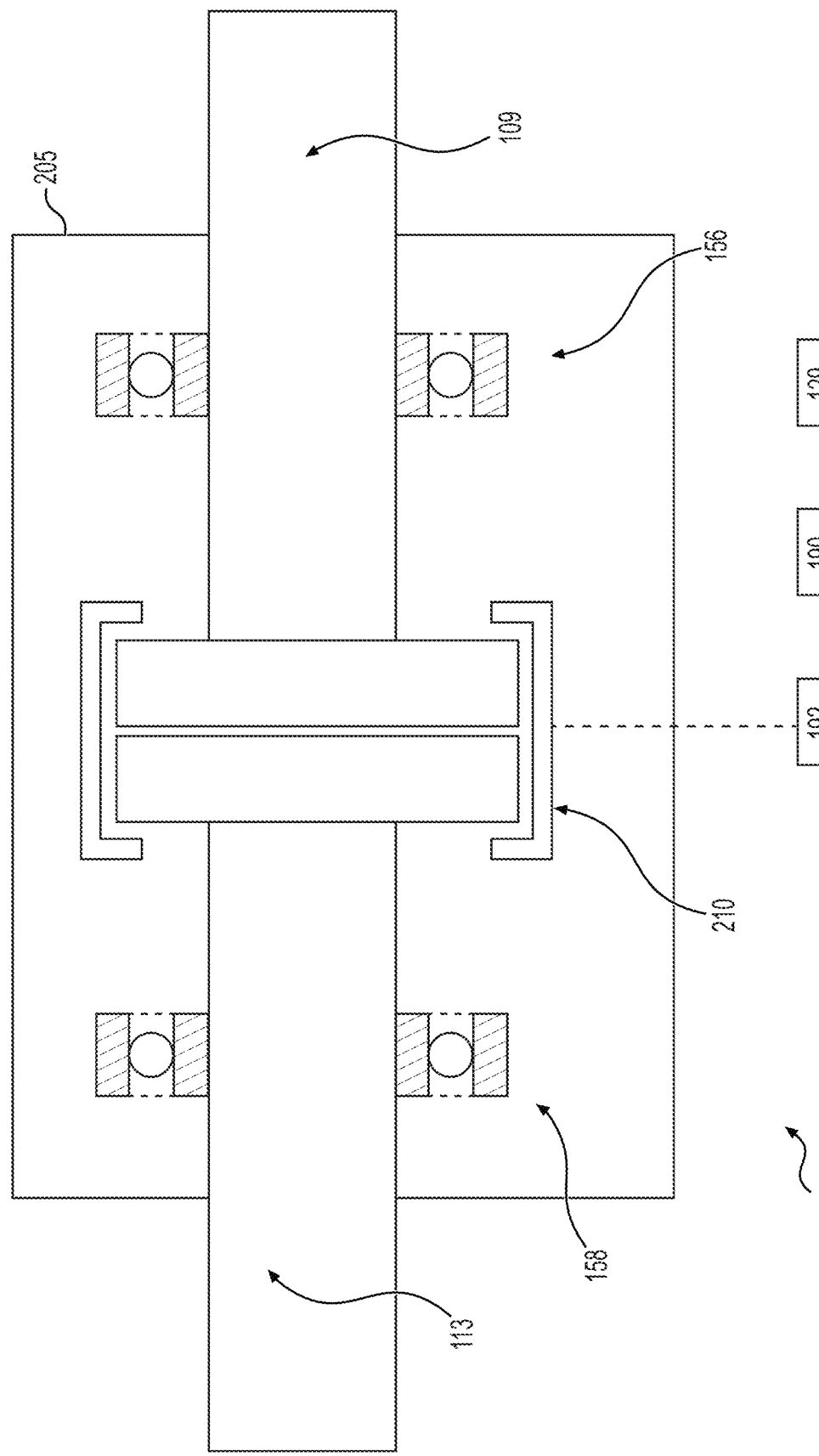
FIG. 9 is a schematic, cross-sectional view of another implementation of a disconnect unit for use in the vehicle of FIG. 1.

Another implementation of a disconnect unit 200 is illustrated in FIG. 9. The disconnect unit 200 includes a disconnect assembly 210 which is a clutch pack assembly 210. The clutch pack assembly 210 selectively connects the shafts 109, 113 by selectively squeezing together clutch plates to transfer torque or by releasing and allowing clutch plates to separate such that torque is not transferred. Specific details and components of a particular implementation of the clutch pack could vary.

The vehicle 10 further includes a control system 160, including a controller 190 and an actuator 192, for controlling the disconnect unit 150. The controller 190 is computer-implemented for operating the actuator 192 to cause the disconnect unit 150 to activate and deactivate; methods of controlling of the disconnect unit 150 are described in more detail below. While illustrated as a separate device, it is also contemplated that the controller 190 could be implemented as part of other computational systems of the vehicle 10. For example, the controller 190 could be implemented as part of the Engine Control Unit (ECU).

Figure 10:
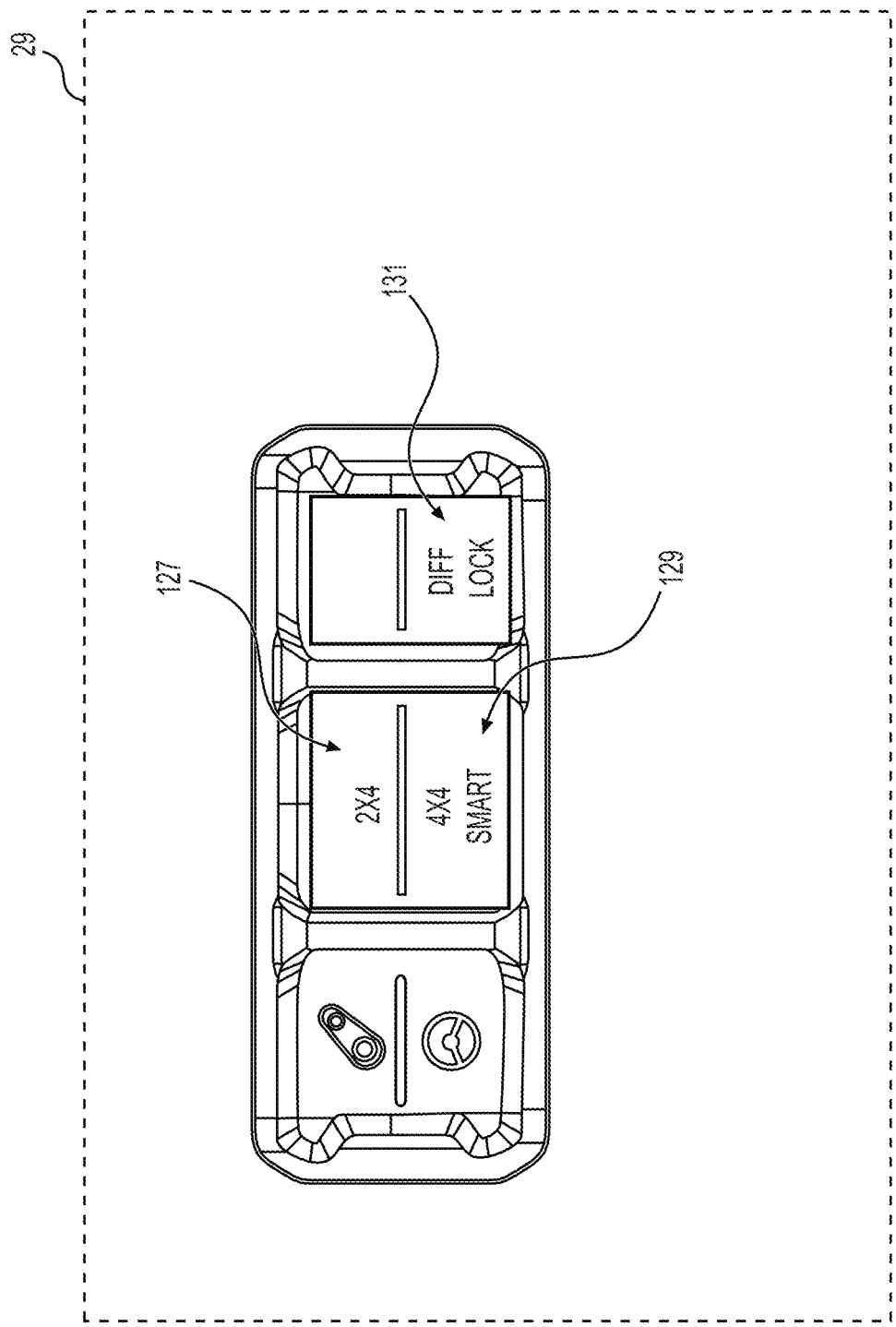
FIG. 10 is a schematic view of a user display of the vehicle of FIG. 1.

The vehicle 10 includes a control input 129 disposed in the cockpit area 22, configured and arranged to be operable for the operator sitting in the cockpit area 22. As is illustrated in FIG. 10, the control input 129 in the present implementation is a button 129 disposed on the display 29 in the cockpit area 22. The control input 129 is connected to the actuator 192 via the controller 190. In some implementations, it is contemplated that the control input 129 could be connected directly to the actuator 192 in order to activate or deactivate the disconnect unit 150 directly, without use of the controller 190.

The control input 129 further controls different driving modes, according to which the controller 190 decides to activate or deactivate the disconnect unit 150. The controller 190 is configurable to control the disconnect unit 150 according to a plurality of driving modes, including but not limited to: a mode for driving on trails ("trail mode"), a mode for driving in mud ("mud mode") and a mode for rock crawling ("rock crawling mode"). By repeatedly pressing the input button 129, the operator can select one of these modes.

With further reference to FIG. 10, the display 29 also includes a 2×4 mode input button 127 and a front differential lock input button 131. The input buttons 127, 131 are communicatively connected to the controller 190 in order to send indications to the controller 190 to control the drivetrain 100. Specifically, upon receiving an indication that the operator has pushed the input button 127, the controller 190 deactivates the disconnect unit 150 to cease transferring torque to the front gear train 35, thereby setting the vehicle 10 to drive in 2×4 mode. Upon receiving an indication that the operator has pushed the input button 131, the controller 190 activates the disconnect unit 150 to transfer torque to the front gear train 35 to such that the vehicle 10 drives in 4×4 mode (if not already in 4×4 mode), and subsequently locks the front gear train 35 such that the two front wheels 14 rotate in a synchronized manner (locked). As is illustrated schematically in FIG. 4, the front gear train 35 is also communicatively connected to the controller 190 such that the controller 190 can control locking of the front gear train 35. It is contemplated that in some implementations, the input 127, the control input 129 and/or the lock input 131 could be software based, accessed and controlled by the operator through a touch-screen disposed in the cockpit area 22. In some such implementations, the driving mode could further be chosen from the touch-screen.

The vehicle 10 further includes a plurality of sensors communicatively connected to the controller 190 for controlling the disconnect unit 150 as part of the control system 160, control of the disconnect unit 150 being described in more detail below. The sensors and the controller 190 are illustrated schematically in FIG. 4.

The vehicle 10 includes a front wheel speed sensor 162 disposed in a front portion of the vehicle 10, for measuring the speed of one or both front wheels 14. The vehicle 10 similarly also includes a rear wheel speed sensor 164, disposed in a rear portion of the vehicle 10, for measuring the speed of one or both rear wheels 18. Depending on the particular implementation, it is contemplated that the wheel speed sensors 162, 164 could also detect and measure wheel speed acceleration. It is also contemplated that each wheel 14, 18 could be provided with a corresponding wheel speed sensor 162 or 164.

The vehicle 10 also includes a brake sensor 166 for sensing braking activity. While schematically illustrated at being disposed in proximity to a brake pedal (not illustrated), it is contemplated that the brake sensor 166 could be communicatively connected to a braking system of the vehicle 10 and be disposed elsewhere. In some implementations, it is contemplated that the brake sensor 166 could be implemented directly by the controller 190, such that the controller 190 could receive signals from a computer-implemented braking control system.

The vehicle 10 similarly includes an accelerator position sensor 168 for sensing a position of an accelerator pedal (not illustrated) and a position gradient of the accelerator pedal (velocity of accelerator pedal movement). While schematically illustrated at being disposed in proximity to the accelerator pedal, it is contemplated that the accelerator position sensor 168 could also be disposed elsewhere in the vehicle 10.

The vehicle 10 further includes an engine torque sensor 170 for sensing the magnitude and gradient of magnitude of torque produced by the engine 30 and transferred to the transmission 32. In some implementations, the engine torque sensor 170 could be implemented by the ECU.

In order to monitor overall movement of the vehicle 10, there is further included an accelerometer 172 and gyroscope 174 for measuring linear and angular acceleration, respectively, of the vehicle 10.

Each of the sensors 162, 164, 166, 168, 170, 172, 174 is communicatively connected to the controller 190 for sending information measured or determined by the sensors 162, 164, 166, 168, 170, 172, 174 to the controller 190. It is noted that the placement of each of the sensors 162, 164, 166, 168, 170, 172, 174 is illustrated schematically, and the exact location in which each of the sensors 162, 164, 166, 168, 170, 172, 174 is disposed may vary. Similarly, each sensor 162, 164, 166, 168, 170, 172, 174 is illustrated as communicatively or electronically connecting directly to the controller 190, but it is contemplated that the communication path between the sensors 162, 164, 166, 168, 170, 172, 174 and the controller 190 may vary. It is also contemplated that the vehicle 10 could include additional sensors.

As is illustrated in FIGS. 4 to 6, the vehicle 10 further includes a power take-off assembly 185 for selectively receiving and powering a rear accessory. The power take-off assembly 185 is operatively connected to the transmission 32 via the rear gear train 55. Specifically, the assembly 185 connects to a rear end of a shaft 187, which connects at its front end to the rear gear train 55. The assembly 185 is an accessory disconnect assembly 185 in order to selectively transfer torque to the rear accessory when connected thereto.

Figure 11:
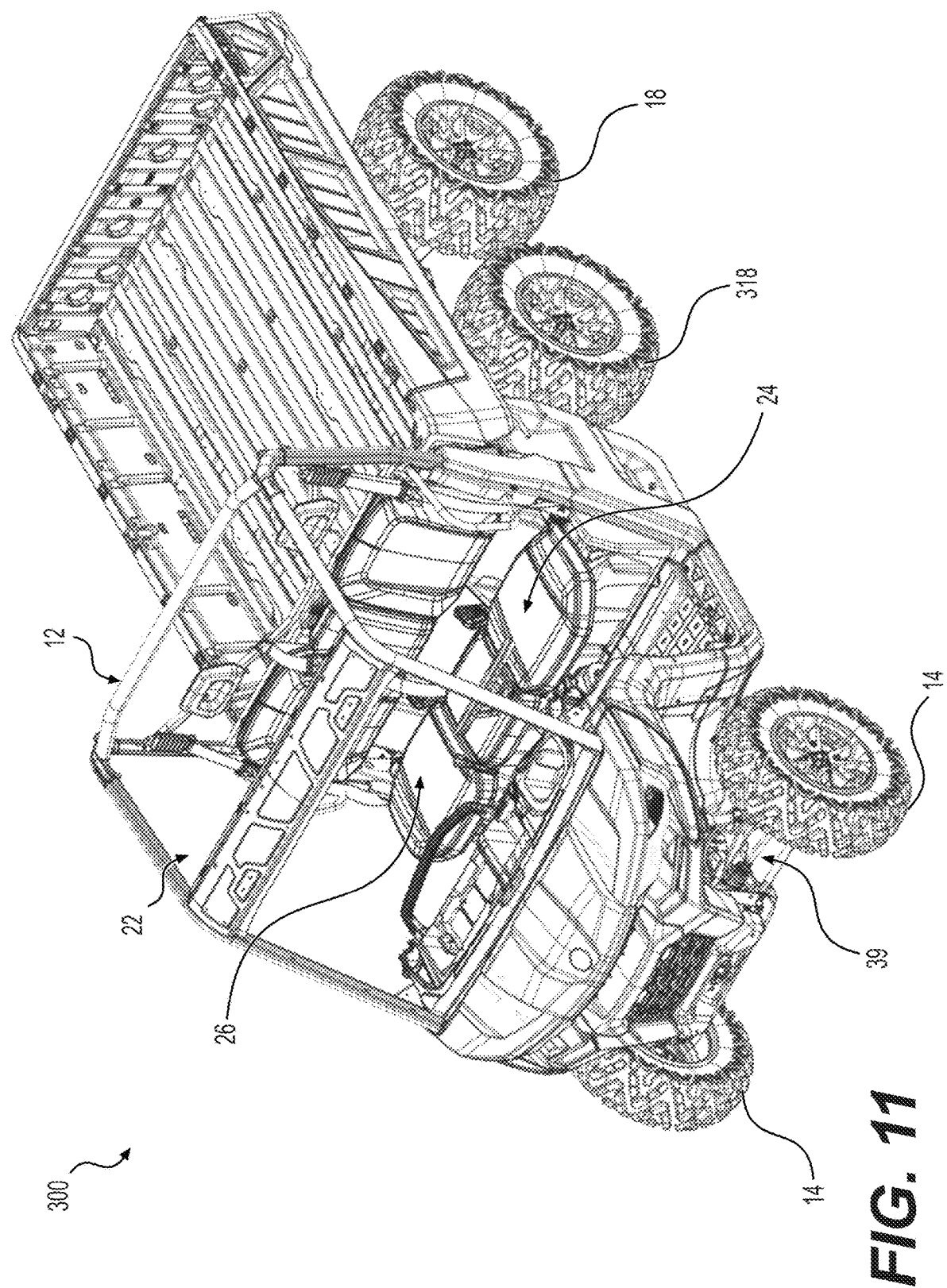
FIG. 11 is a top, front, left side perspective view of a six-wheel vehicle according to another implementation of the present technology.
Figure 12:
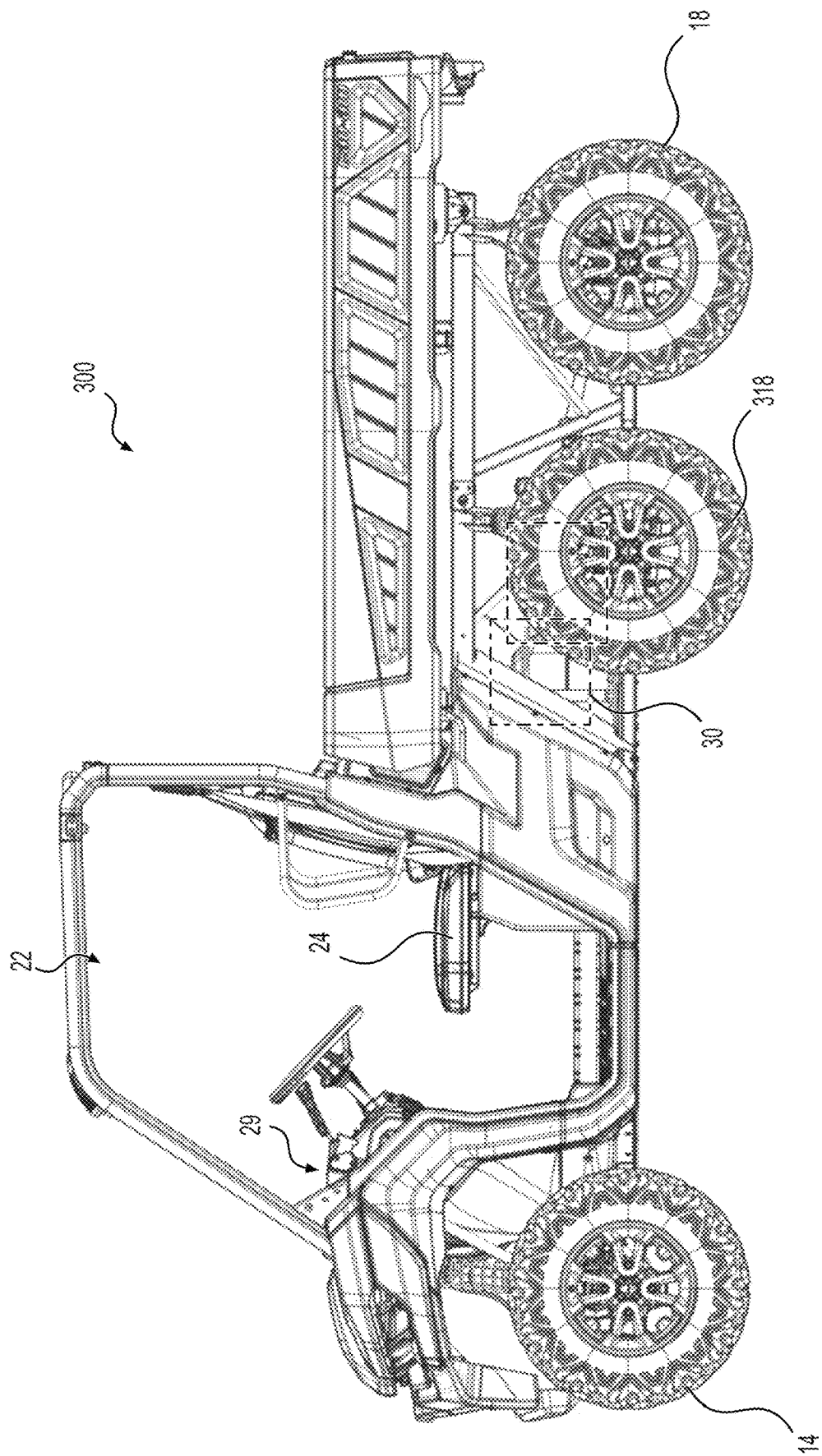
FIG. 12 is a left side elevation view of the vehicle of FIG. 10.
Figure 13:
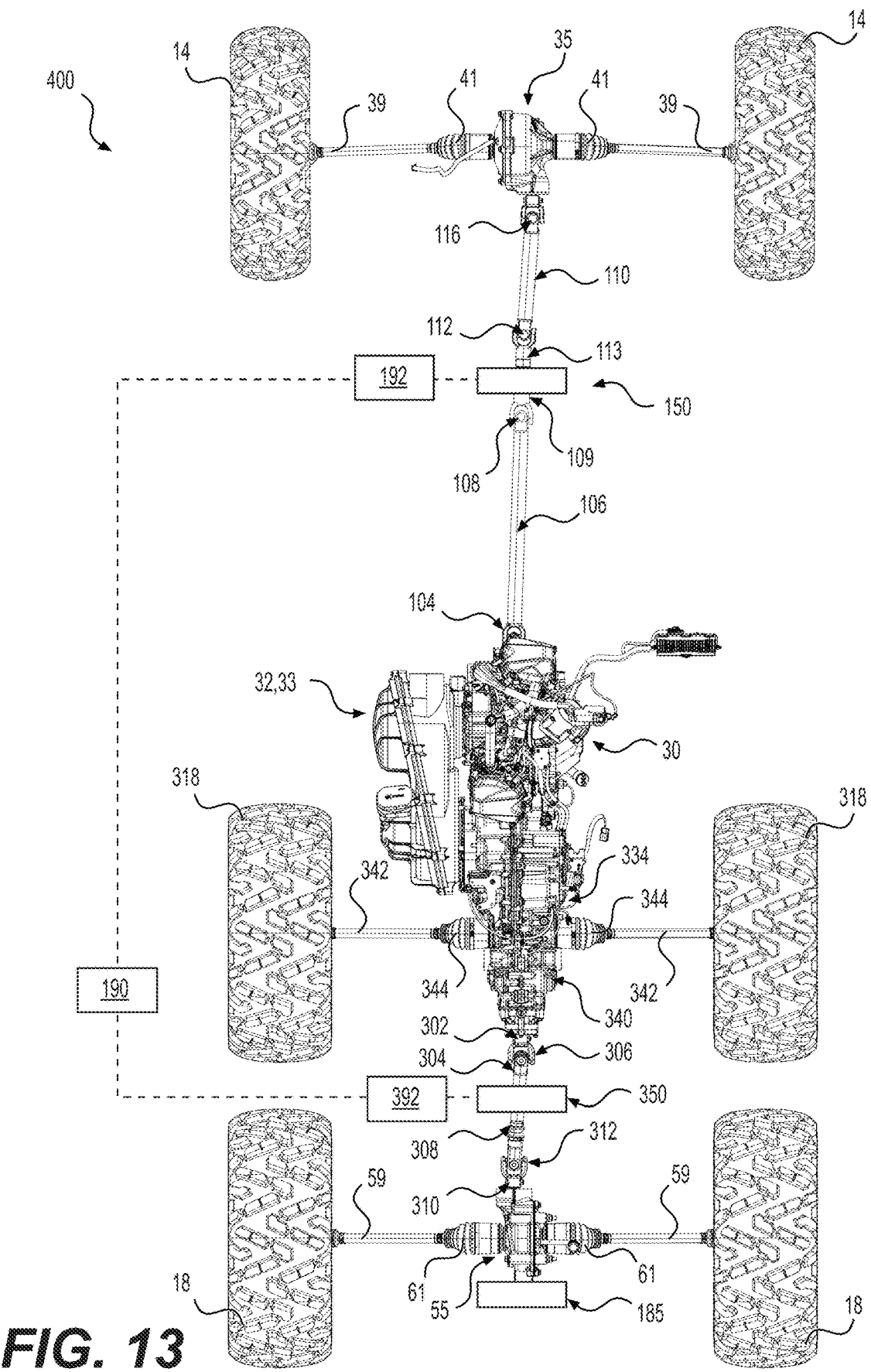
FIG. 13 is a top plan view of a powertrain and wheels of the vehicle of FIG. 10.

Another implementation of a vehicle 300 according to the present technology is illustrated in FIGS. 11 to 13. Elements of the vehicle 300 that are similar to those of the vehicle 10 retain the same reference numeral and will generally not be described again. It will be understood that variants of certain components may be used for the vehicle 300 (e.g., a different motor, a different CVT, different seats, different wheels, etc.) instead of the same exact components as in the vehicle 10.

The vehicle 300 is a six-wheeled vehicle 300 including dual rear axles (i.e., having two sets of rear wheels) which may provide additional traction when driving the vehicle 300. The two sets of rear wheels are identified herein as right and left intermediate wheels 318 (disposed rearward of the front wheels 14) and the rear wheels 18 (disposed rearward of the intermediate wheels 318). A drivetrain 400 of the vehicle 300 includes the disconnect 150 selectively connecting the front gear train 35 to the transmission 34, details of which will not be described again.

As is illustrated in FIG. 13, a transaxle 334 of the drivetrain 400 incorporates an intermediate gear train 340. The driven output gears (not shown) of the intermediate gear train 340 are operatively connected to and drive left and right intermediate half-shafts 342 via constant velocity (CV) joints (not shown), also known as homokinetic joints, located inside flexible covers 344. The laterally outward ends of the intermediate half-shafts 342 are operatively connected to and drive the wheel axles (not shown) to drive the intermediate wheels 318.

As the transaxle 334 is disposed in a middle portion of the vehicle 300, the drivetrain 400 further includes a series of shafts and joints to operatively connect the rear gear train 55 to the transmission 32. The transaxle 334 has a plurality of gear trains connected to and driving a rear output shaft 302. The rear output shaft 302 is operatively connected to and drives a driveshaft 304 via a universal joint 306.

From the universal joint 306, the driveshaft 304 extends rearward and toward the left. The rear end of the driveshaft 304 is connected to and extends partially into a rear disconnect unit 350. The rear disconnect unit 350 is implemented as described above with respect to the front disconnect unit 150, although it is contemplated that different implementations of disconnect unit (such as the disconnect unit 200) could be used. The vehicle 300 also includes a rear actuator 392 for controlling the disconnect unit 350, the actuator 392 being communicatively connected to the controller 190.

Another driveshaft 308 is connected to and extends partially into a rear side of the rear disconnect unit 150. The driveshaft 308 connects to a rear input shaft 310 via a universal joint 312. From the universal joint 312, the rear input shaft 310 extends rearward to drive the rear gear train 55.

Although not separately illustrated, the disconnect unit 350 includes a disconnect assembly configured for selectively operatively connecting the shafts 304, 308, as well as two bearing assemblies for supporting the shaft 304, 308, similarly to the disconnect unit 150.

Due to the connection of the driveshafts 304, 308 via the rear disconnect unit 350, the rear disconnect unit 350 can be used to control transfer of torque from the transmission 32 to the rear gear train 55. In this way, the vehicle 300 is configured to be drivable in any one of a 2×6 mode (with both disconnect units 150, 350 deactivated), a 4×6 mode (with one of the disconnect units 150, 350 activated and the other one deactivated), or a 6×6 mode (with both disconnect units 150, 350 activated).

Figure 14:
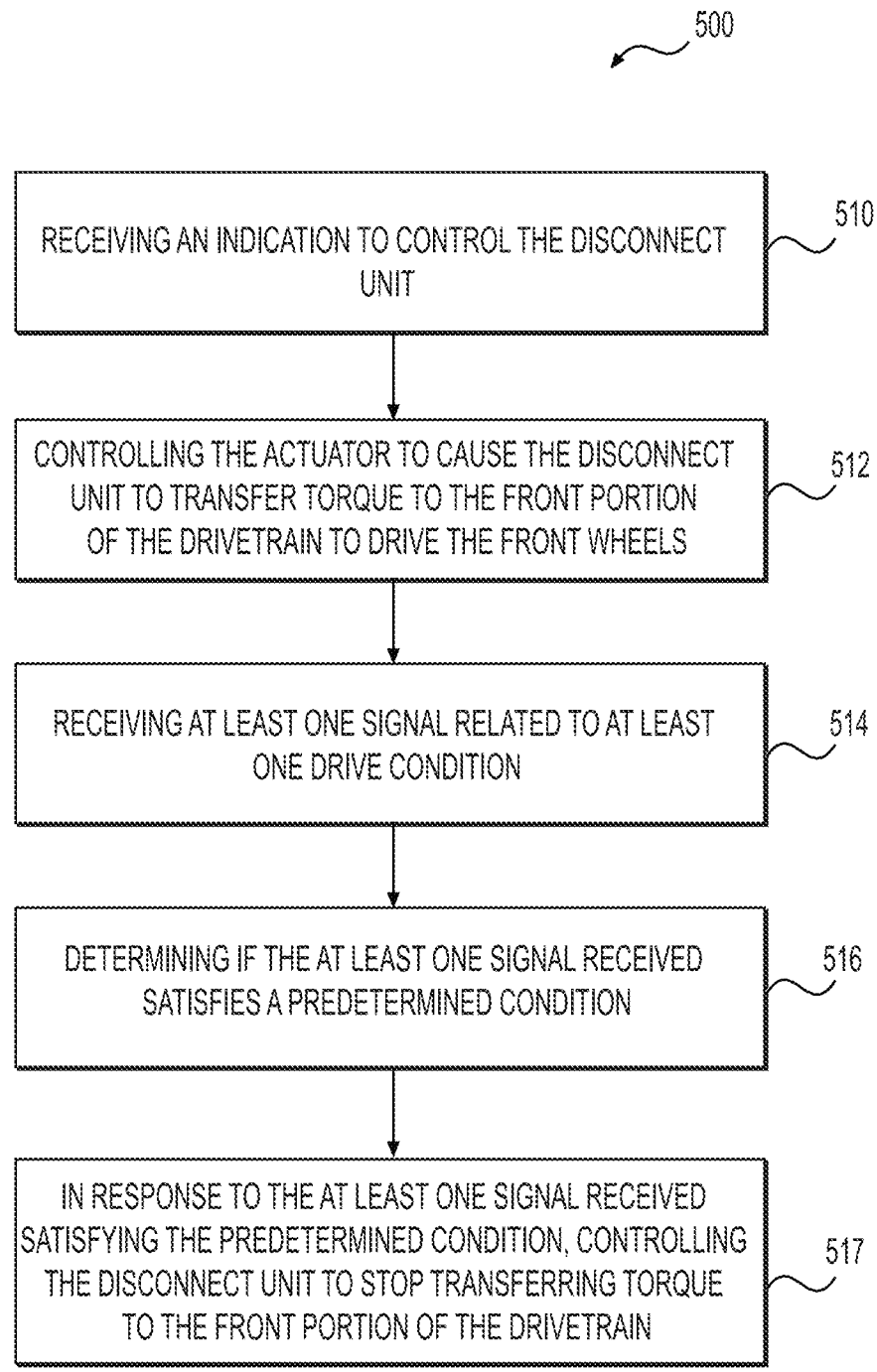
FIG. 14 is a flowchart illustrating a method for controlling the drivetrain of the vehicle of FIG. 1.
Figure 15:
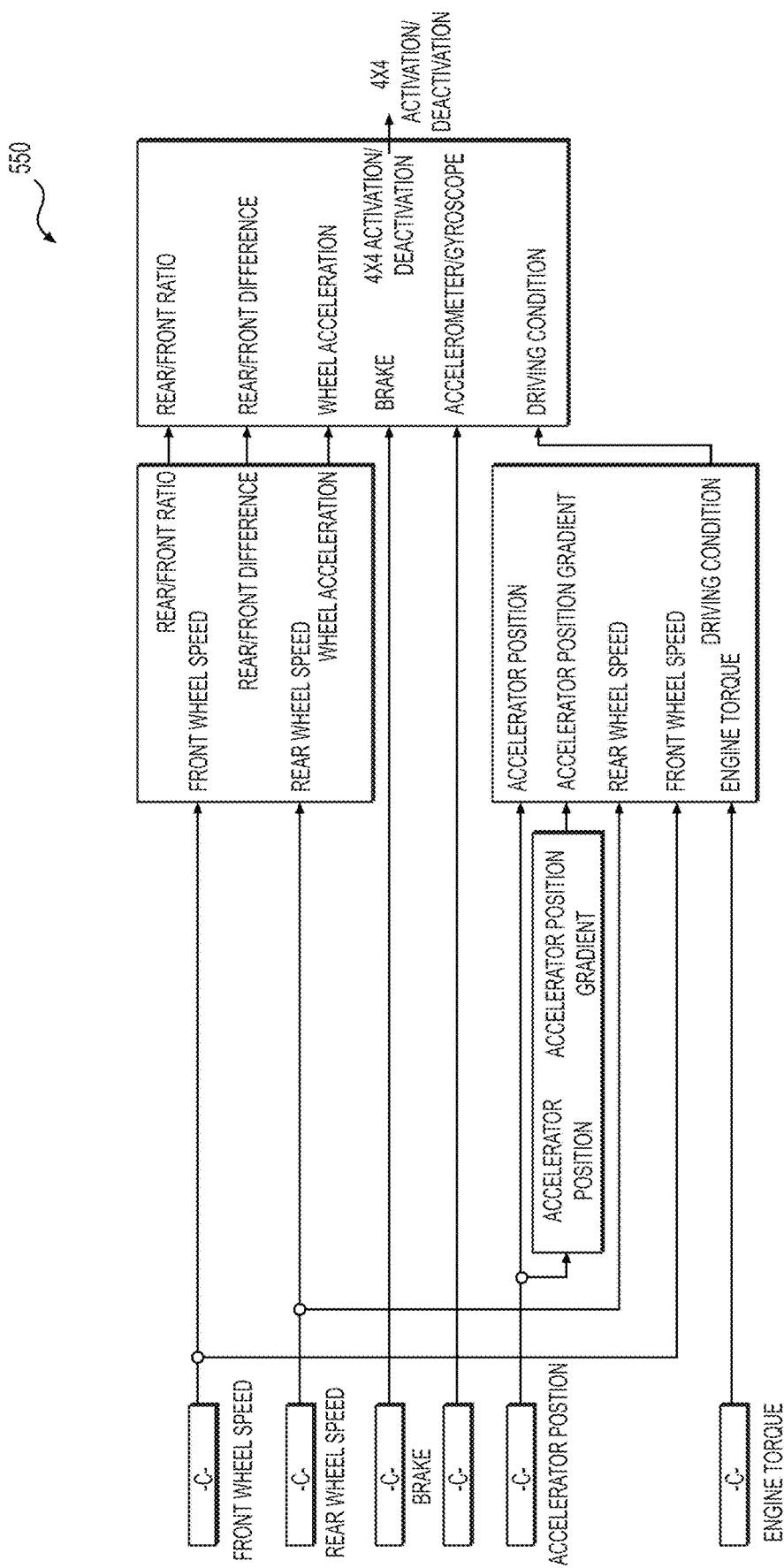
FIG. 15 is a signal flow diagram for controlling the drivetrain of the vehicle of FIG. 1.

A method 500 for controlling the drivetrain 100 of the vehicle 10 will now be described with reference to FIGS. 14 and 15. While not described in detail herein, the method 500 could be similarly used to control the drivetrain 400 of the vehicle 300, mutatis mutandis. The method 500 is illustrated in a flowchart in FIG. 14. FIG. 15 illustrates a signal flow diagram 550 of signals sent between the sensors 162, 164, 166, 168, 170, 172, 174, the controller 190, and the actuator 192 for performing the method 500.

The method 500 begins, at step 510, with receiving, by the controller 190, an indication to control the disconnect unit 150 of the drivetrain 100. In the current implementation, the indication is received from the control input 129, where the operator initiates 4×4 mode by interacting with the control input 129. In the illustrated vehicle 10, specifically, the operator pushes the button 129 to activate 4×4 mode.

The method 500 continues, at step 512, with controlling, by the controller 190, the actuator 192 to cause the disconnect unit 150 to transfer torque to the front portion of the drivetrain 100 to drive the two front wheels 14. By activating the disconnect unit 150, the vehicle 10 is then in 4×4 mode.

The method 500 then continues, at step 514, with receiving, by the controller 190, from at least one of the sensors communicatively connected to the controller 190, one or more signals related to at least one driving condition. In the illustrated implementation, receiving the one or more signals includes receiving the one or more signals from at least one of: the front wheel speed sensor 162, the rear wheel speed sensor 164, the brake sensor 166, the accelerometer 172, the gyroscope 174, the accelerator position sensor 168, and the engine torque sensor 170.

The method 500 then continues, at step 516, with determining if the one or more signals received satisfy one or more predetermined conditions. It is contemplated that the predetermined conditions could be calculated by and/or stored to the controller 190.

In some implementations, determining if the one or more signals received satisfy the predetermined condition(s) includes comparing to predetermined condition values, stored in the controller 190. In some cases, comparing the signals to the predetermined conditions could include comparing the one or more predetermined condition values to the at least one of: the front wheel speed, the rear wheel speed, the accelerator position, the accelerator position gradient, the acceleration, the angular acceleration, and the engine torque.

The method 500 then continues, at step 518, with controlling, by the controller 190, the disconnect unit 150 to stop transferring torque to the front portion of the drivetrain 100, in response to the one or more signals received satisfying the predetermined condition(s).

In some implementations, the method 500 further includes, subsequent to controlling the disconnect unit 150 to stop transferring torque to the front portion of the drivetrain 100, receiving, by the controller 190 at least one additional signal related to at least one additional driving condition. The method 500 could then further include determining if the at least one additional signal received satisfies an additional predetermined condition. Then, in response to the at least one additional signal satisfying the additional predetermined condition, the method 500 could further include controlling, by the controller 190, the disconnect unit 150 to recommence transferring torque to the front portion of the drivetrain 100, thereby driving the front wheels 14.

In some implementations, the method 500 further includes receiving, by the controller 190, from the control input 129, at least one activation signal prior to controlling the actuator 192 to cause the disconnect unit 150 to transfer torque to the front portion of the drivetrain 100. In such a case, the activation signal could be the indication to control the disconnect unit 150 and could be received form the control input 129.

In some implementations, receiving the at least one signal includes: receiving, by the controller 190, a front wheel speed from the front wheel speed sensor 162 and a rear wheel speed from the rear wheel speed sensor 164. The method 500 could then further include determining, based on at least the front wheel speed and the rear wheel speed, at least one of: a rear to front wheel speed ratio, and a rear to front wheel speed difference. The method 500 could then further include controlling the disconnect unit 150 in response to the rear to front wheel speed ratio and/or the rear to front wheel speed difference satisfying a predetermined speed condition.

In some implementations, determining if the at least one signal received satisfies the predetermined condition includes comparing predetermined condition values, stored in the controller 190, to one or more of: the front wheel speed, the rear wheel speed, the accelerator position, the accelerator position gradient, the acceleration, the angular acceleration, and the engine torque.

In some implementations, the method 500 includes receiving, by the controller 190, a second signal related to a different driving condition. The second signal could include at least one of the front wheel speed, the rear wheel speed, the accelerator position, the accelerator position gradient, the acceleration, the angular acceleration, and the engine torque. The method 500 could then further include determining if the second signal received satisfies a second predetermined condition and controlling, by the controller 190, the disconnect unit 150 to recommence transferring torque to the front portion of the drivetrain 100 in response to the second signal received satisfying the second predetermined condition.

In some implementations, the controller 190 is configured to control the disconnect unit 150 according to the driving modes as described above, including but not limited to the mode for driving on trails ("trail mode"), the mode for driving in mud ("mud mode") and the mode for rock crawling ("rock crawling mode"). In some such implementations, the indication to control the disconnect unit 150 includes an indication of selection of one of the driving modes. In some implementations, the driving mode is selected by the operator using the control input 129.

In some implementations, the method 500 could further include receiving an indication, by the controller 190, from the differential lock input 131, to lock the front gear train 35. In such an implementation, the method 500 would pause monitoring the driving conditions to control the disconnect unit 150, as the drivetrain remains in the 4×4 drive mode while the front gear train 35 is locked.

In some implementations, the method 500 could further include receiving an indication, by the controller 190, from the 2×4 mode input button 127 to return the drivetrain 100 to 2×4 mode by controlling the disconnect unit 150 to deactivate and cease transferring torque to the front gear train 35.

It is contemplated that the method 500 could include additional or different steps, either to perform additional functions and/or to perform the steps described above.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for controlling a drivetrain of a vehicle comprising:
   a frame;
   a motor connected to the frame;
   a transmission operatively connected to the motor for receiving torque therefrom;
   a rear gear train operatively connected to the transmission;
   two rear wheels operatively connected the rear gear train for driving the rear wheels;
   a disconnect unit operatively connected to the transmission, the disconnect unit being disposed forward of the motor;
   a front gear train operatively connected to the disconnect unit, the front gear train being disposed forward of the disconnect unit;
   two front wheels operatively connected to the front gear train for driving the front wheels;
   an actuator operatively connected to the disconnect unit for controlling selective torque transfer through the disconnect unit; and
   a controller communicatively connected to the actuator for controlling the disconnect unit,
   the method comprising:
   receiving, by the controller, an indication to control the disconnect unit of the drivetrain, the disconnect unit being configured to selectively transfer torque to a front portion of the drivetrain to drive the two front wheels of the vehicle;
   controlling, by the controller, the actuator to cause the disconnect unit to transfer torque to the front portion of the drivetrain to drive the two front wheels;
   receiving, by the controller, from at least one sensor communicatively connected to the controller, at least one signal related to at least one driving condition,
   receiving the at least one signal related to the at least one driving condition from the at least one sensor including:
   receiving, by the controller, a front wheel speed from a front wheel speed sensor, and
   receiving, by the controller, a rear wheel speed from a rear wheel speed sensor;
   determining if the at least one signal received satisfies a predetermined condition;
   in response to the at least one signal received satisfying the predetermined condition, controlling, by the controller, the disconnect unit to stop transferring torque to the front portion of the drivetrain,
   determining, by the controller, based on at least the front wheel speed and the rear wheel speed, at least one of:
   a rear to front wheel speed ratio, and
   a rear to front wheel speed difference; and
   controlling the disconnect unit to stop selectively transferring torque to the front portion of the drivetrain in response to receiving the at least one signal includes controlling the disconnect unit in response to the at least one of the rear to front wheel speed ratio and the rear to front wheel speed difference satisfying a predetermined speed condition.

2. The method of claim 1, further comprising, subsequent to controlling the disconnect unit to stop transferring torque to the front portion of the drivetrain:
   receiving, by the controller, from the at least one sensor, at least one additional signal related to at least one additional driving condition;
   determining if the at least one additional signal received satisfies an additional predetermined condition; and
   in response to the at least one additional signal satisfying the additional predetermined condition, controlling, by the controller, the disconnect unit to recommence transferring torque to the front portion of the drivetrain thereby driving the front wheels.

3. The method of claim 1, wherein receiving the indication to control the disconnect unit includes receiving the indication to control the disconnect unit from a control input disposed in a cockpit area of the vehicle.

4. The method of claim 3, wherein:
the controller is configured to control the disconnect unit according to a plurality of driving modes; and
receiving the indication to control the disconnect unit includes receiving, by the controller, from the control input, an indication of selection of one of the plurality of driving modes.

5. The method of claim 3, further comprising:
prior to controlling the actuator to cause the disconnect unit to transfer torque to the front portion of the drivetrain, receiving, by the controller, from the control input, at least one activation signal; and
wherein:
the controller controls the actuator to cause the disconnect unit to transfer torque to the front portion of the drivetrain to drive the two front wheels in response to the at least one activation signal.

6. The method of claim 1, wherein: receiving the at least one signal from the at least one sensor includes receiving the at least one signal from at least one of:
a front wheel speed sensor;
a rear wheel speed sensor;
a brake sensor;
an accelerometer;
a gyroscope;
an accelerator position sensor; and
an engine torque sensor.

7. The method of claim 1, wherein:
receiving the at least one signal related to the at least one driving condition from the at least one sensor includes receiving, by the controller, at least one of:
a front wheel speed from a front wheel speed sensor,
a rear wheel speed from a rear wheel speed sensor,
an accelerator position from an accelerator position sensor,
an accelerator position gradient from the accelerator position sensor,
a brake state from a brake sensor,
an acceleration from an accelerometer,
an angular acceleration from a gyroscope, and
an engine torque from an engine torque sensor; and
determining if the at least one signal received satisfies the predetermined condition includes comparing to predetermined condition values, stored in the controller, to the at least one of the front wheel speed, the rear wheel speed, the accelerator position, the accelerator position gradient, the acceleration, the angular acceleration, and the engine torque.

8. The method of claim 7, wherein:
the at least one signal is at least one first signal;
the predetermined condition is a first predetermined condition; and
further comprising:
receiving, by the controller, a second signal related to a different driving condition, the second signal including at least one of the front wheel speed, the rear wheel speed, the accelerator position, the accelerator position gradient, the acceleration, the angular acceleration, and the engine torque;
determining if the second signal received satisfies a second predetermined condition; and
in response to the second signal received satisfying the second predetermined condition, controlling, by the controller, the disconnect unit to recommence transferring torque to the front portion of the drivetrain.

9. The method of claim 1, wherein:
the controller is configured to control the disconnect unit according to a plurality of driving modes;
the indication to control the disconnect unit includes an indication of selection of one of the plurality of driving modes.

10. The method of claim 9, wherein the plurality of driving modes includes at least:
a mode for driving on trails;
a mode for driving in mud; and
a mode for rock crawling.

11. A vehicle comprising:
a frame;
a motor connected to the frame;
a transmission operatively connected to the motor for receiving torque therefrom;
a rear gear train operatively connected to the transmission;
two rear wheels operatively connected the rear gear train for driving the rear wheels;
a disconnect unit operatively connected to the transmission, the disconnect unit being disposed forward of the motor;
a front gear train operatively connected to the disconnect unit, the front gear train being disposed forward of the disconnect unit;
two front wheels operatively connected to the front gear train for driving the front wheels,
the disconnect unit being configured to selectively transfer torque from the transmission to the front gear train thereby selectively driving the two front wheels;
an actuator operatively connected to the disconnect unit for controlling selective torque transfer through the disconnect unit; and
a controller communicatively connected to the actuator for controlling the disconnect unit, the controller being configured to:
receive an indication to control the disconnect unit of a drivetrain of the vehicle;
control the actuator to cause the disconnect unit to transfer torque to a front portion of the drivetrain to drive the two front wheels;
receive, from at least one sensor communicatively connected to the controller, at least one signal related to at least one driving condition, the controller being configured to receive the at least one signal related to the at least one driving condition from the at least one sensor by:
receiving a front wheel speed from a front wheel speed sensor, and
receiving a rear wheel speed from a rear wheel speed sensor;
determine if the at least one signal received satisfies a predetermined condition;
in response to the at least one signal received satisfying the predetermined condition, control the disconnect unit to stop transferring torque to the front portion of the drivetrain,
determine based on at least the front wheel speed and the rear wheel speed, at least one of:
a rear to front wheel speed ratio, and a rear to front wheel speed difference; and
control the disconnect unit to stop selectively transferring torque to the front portion of the drivetrain in response to receiving the at least one signal includes controlling the disconnect unit in response to the at least one of the rear to front wheel speed ratio and the rear to front wheel speed difference satisfying a predetermined speed condition.

12. The vehicle of claim 11, further comprising a plurality of sensors communicatively connected to the controller, the controller being configured to control the disconnect unit based at least in part on signals received from at least one of the plurality of sensors.

13. The vehicle of claim 12, wherein the plurality of sensors includes at least one of:
a front wheel speed sensor;
a rear wheel speed sensor;
a brake sensor;
an accelerator position sensor;
an engine torque sensor;
an accelerometer; and
a gyroscope.

14. The vehicle of claim 11, further comprising:
a control input communicatively connected to the controller and the actuator; and
wherein:
the frame defines a cockpit area;
the control input is disposed in the cockpit area; and
the control input is configured and arranged to be operable by an operator sitting in the cockpit area.

15. The vehicle of claim 14, wherein:
the disconnect unit is a first disconnect unit, and
the actuator is a first actuator; and
the vehicle further comprises:
an intermediate gear train operatively connected to the transmission, the intermediate gear train being disposed rearward of the front gear train;
two intermediate wheels operatively connected to the intermediate gear train for driving the intermediate wheels;
a second disconnect unit operatively connected between the intermediate gear train and the rear gear train, the second disconnect unit being disposed forward of the rear wheels; and
a second actuator operatively connected to the second disconnect unit for controlling selective torque transfer through the second disconnect unit, the second actuator being communicatively connected to the controller and the control input,
the second disconnect unit being configured to selectively transfer torque from the transmission, via the intermediate gear train, to the rear gear train thereby selectively driving the two rear wheels, the vehicle being configured to be operated in one of a 2×6 mode, a 4×6 mode, and a 6×6 mode.

16. The vehicle of claim 11, further comprising:
at least one seat connected to the frame; and
wherein the motor is disposed at least partially rearward of the at least one seat.

17. The vehicle of claim 11, wherein the controller is configured to control the disconnect unit to stop transferring torque to the front portion of the drivetrain based on at least one of an accelerator position and an accelerator position gradient.

18. A vehicle comprising:
a frame defining a cockpit area;
a motor connected to the frame;
a transmission operatively connected to the motor for receiving torque therefrom;
a rear gear train operatively connected to the transmission;
two rear wheels operatively connected the rear gear train for driving the rear wheels;
a first disconnect unit operatively connected to the transmission, the first disconnect unit being disposed forward of the motor;
a front gear train operatively connected to the first disconnect unit, the front gear train being disposed forward of the first disconnect unit;
two front wheels operatively connected to the front gear train for driving the front wheels,
the first disconnect unit being configured to selectively transfer torque from the transmission to the front gear train thereby selectively driving the two front wheels;
a first actuator operatively connected to the first disconnect unit for controlling selective torque transfer through the first disconnect unit;
an intermediate gear train operatively connected to the transmission, the intermediate gear train being disposed rearward of the front gear train;
two intermediate wheels operatively connected to the intermediate gear train for driving the intermediate wheels;
a second disconnect unit operatively connected between the intermediate gear train and the rear gear train, the second disconnect unit being disposed forward of the rear wheels; and
a second actuator operatively connected to the second disconnect unit for controlling selective torque transfer through the second disconnect unit,
the second disconnect unit being configured to selectively transfer torque from the transmission, via the intermediate gear train, to the rear gear train thereby selectively driving the two rear wheels, the vehicle being configured to be operated in one of a 2×6 mode, a 4×6 mode, and a 6×6 mode;
a controller communicatively connected to the first actuator for controlling the first disconnect unit and to the second actuator for controlling the second disconnect unit; and
a control input communicatively connected to the controller, the first actuator, and the second actuator,
the control input being disposed in the cockpit area, the control input being configured and arranged to be operable by an operator sitting in the cockpit area.

19. A vehicle comprising:
a frame;
a motor connected to the frame;
a transmission operatively connected to the motor for receiving torque therefrom;
a rear gear train operatively connected to the transmission;
two rear wheels operatively connected the rear gear train for driving the rear wheels;
a disconnect unit operatively connected to the transmission, the disconnect unit being disposed forward of the motor;
a front gear train operatively connected to the disconnect unit, the front gear train being disposed forward of the disconnect unit;
two front wheels operatively connected to the front gear train for driving the front wheels, the disconnect unit being configured to selectively transfer torque from the transmission to the front gear train thereby selectively driving the two front wheels;

an actuator operatively connected to the disconnect unit for controlling selective torque transfer through the disconnect unit; and a controller communicatively connected to the actuator for controlling the disconnect unit, the controller being configured to:
receive an indication to control the disconnect unit of a drivetrain of the vehicle;
control the actuator operatively connected to the disconnect unit to cause the disconnect unit to transfer torque to a front portion of the drivetrain to drive the two front wheels;
receive from at least one sensor communicatively connected to the controller, at least one signal related to at least one driving condition;
determine if the at least one signal received satisfies a predetermined condition;
in response to the at least one signal received satisfying the predetermined condition, control the disconnect unit to stop transferring torque to the front portion of the drivetrain;
subsequent to controlling the disconnect unit to stop transferring torque to the front portion of the drivetrain:
receive from the at least one sensor, at least one additional signal related to at least one additional driving condition;
determine if the at least one additional signal received satisfies an additional predetermined condition; and
in response to the at least one additional signal satisfying the additional predetermined condition, control the disconnect unit to recommence transferring torque to the front portion of the drivetrain thereby driving the front wheels.

20. A vehicle comprising:
a frame;
a motor connected to the frame;
a transmission operatively connected to the motor for receiving torque therefrom;
a rear gear train operatively connected to the transmission;
two rear wheels operatively connected the rear gear train for driving the rear wheels;
a disconnect unit operatively connected to the transmission, the disconnect unit being disposed forward of the motor;
a front gear train operatively connected to the disconnect unit, the front gear train being disposed forward of the disconnect unit;
two front wheels operatively connected to the front gear train for driving the front wheels, the disconnect unit being configured to selectively transfer torque from the transmission to the front gear train thereby selectively driving the two front wheels;

an actuator operatively connected to the disconnect unit for controlling selective torque transfer through the disconnect unit; and a controller communicatively connected to the actuator for controlling the disconnect unit, the controller being configured to:
receive an indication to control the disconnect unit of a drivetrain of the vehicle;
control the actuator operatively connected to the disconnect unit to cause the disconnect unit to transfer torque to a front portion of the drivetrain to drive the two front wheels;
receive, from at least one sensor communicatively connected to the controller, at least one first signal related to at least one driving condition, receiving the at least one first signal including receiving, by the controller, at least one of:
a front wheel speed from a front wheel speed sensor,
a rear wheel speed from a rear wheel speed sensor,
an accelerator position from an accelerator position sensor,
an accelerator position gradient from the accelerator position sensor,
a brake state from a brake sensor,
an acceleration from an accelerometer,
an angular acceleration from a gyroscope, and
an engine torque from an engine torque sensor;
determine if the at least one first signal received satisfies a first predetermined condition, determining if the at least one first signal received satisfies the first predetermined condition including comparing to predetermined condition values, stored in the controller, to the at least one of the front wheel speed, the rear wheel speed, the accelerator position, the accelerator position gradient, the acceleration, the angular acceleration, and the engine torque;
in response to the at least one first signal received satisfying the first predetermined condition, control the disconnect unit to stop transferring torque to the front portion of the drivetrain;
receive a second signal related to a different driving condition, the second signal including at least one of the front wheel speed, the rear wheel speed, the accelerator position, the accelerator position gradient, the acceleration, the angular acceleration, and the engine torque;
determine if the second signal received satisfies a second predetermined condition; and
in response to the second signal received satisfying the second predetermined condition, control the disconnect unit to recommence transferring torque to the front portion of the drivetrain.

\* \* \* \* \*